(12) United States Patent
Si et al.

(10) Patent No.: US 12,445,995 B2
(45) Date of Patent: Oct. 14, 2025

(54) POSITIONING MEASUREMENT METHOD AND APPARATUS AND COMMUNICATION DEVICE

(71) Applicant: VIVO MOBILE COMMUNICATION CO., LTD., Dongguan (CN)

(72) Inventors: Ye Si, Dongguan (CN); Huaming Wu, Dongguan (CN); Yuanyuan Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 397 days.

(21) Appl. No.: 18/094,338

(22) Filed: Jan. 6, 2023

(65) Prior Publication Data

US 2023/0262649 A1     Aug. 17, 2023

Related U.S. Application Data

(63) Continuation of application No. PCT/CN2021/105408, filed on Jul. 9, 2021.

(30) Foreign Application Priority Data

Jul. 9, 2020   (CN) .......................... 202010658220.9

(51) Int. Cl.
- *H04W 64/00*   (2009.01)
- *H04L 5/00*    (2006.01)
- *H04W 24/10*   (2009.01)
- *H04W 72/0457* (2023.01)

(52) U.S. Cl.
CPC ........... *H04W 64/00* (2013.01); *H04L 5/0051* (2013.01); *H04W 24/10* (2013.01); *H04W 72/0457* (2023.01)

(58) Field of Classification Search
CPC . H04W 64/00; H04W 24/10; H04W 72/0457; H04L 5/001; H04L 5/0048; H04L 5/0051; H04L 5/0098
See application file for complete search history.

(56) References Cited

U.S. PATENT DOCUMENTS

| | | | |
|---|---|---|---|
| 2020/0154446 A1 | 5/2020 | Yerramalli et al. | |
| 2020/0314793 A1* | 10/2020 | Kumar | .................... G01S 19/48 |
| 2021/0067990 A1* | 3/2021 | Opshaug | ............... H04W 24/10 |
| 2021/0329618 A1* | 10/2021 | Chervyakov | ......... H04W 72/54 |

(Continued)

FOREIGN PATENT DOCUMENTS

| | | |
|---|---|---|
| CN | 110365455 A | 10/2019 |
| CN | 110730056 A | 1/2020 |

(Continued)

OTHER PUBLICATIONS

International Search Report issued in corresponding International Application No. PCT/CN2021/105408, mailed Oct. 11, 2021, 4 pages.

(Continued)

*Primary Examiner* — Siu M Lee
(74) *Attorney, Agent, or Firm* — IPX PLLC

(57) ABSTRACT

A positioning measurement method and apparatus and a communication device are provided. The positioning measurement method includes: switching a terminal to a target BWP, and performing positioning reference signal (PRS) measurement in the target BWP.

19 Claims, 6 Drawing Sheets

(56) References Cited

U.S. PATENT DOCUMENTS

| | | | |
|---|---|---|---|
| 2022/0229145 A1* | 7/2022 | Berggren | H04L 5/0082 |
| 2023/0025902 A1* | 1/2023 | Xu | H04W 72/51 |
| 2023/0180173 A1* | 6/2023 | Kazmi | H04L 5/001 |
| | | | 455/456.1 |
| 2023/0180174 A1* | 6/2023 | Yerramalli | G01S 1/0428 |
| | | | 455/456.3 |

FOREIGN PATENT DOCUMENTS

| | | | |
|---|---|---|---|
| CN | 111342943 A | 6/2020 | |
| WO | WO-2020191736 A1 * | 10/2020 | H04L 5/001 |
| WO | WO-2020229066 A1 * | 11/2020 | G01S 1/0428 |

OTHER PUBLICATIONS

Ericsson, "Email discussion summary for [95e][217] NR_pos_RRM_Part_3", 3GPP TSG-RAN WG4 Meeting # 95-e R4-2009029, Jun. 2020, 52 pages.

First Office Action issued in related Chinese Application No. 202010658220.9, mailed May 30, 2022, 5 pages.

Intel Corporation, "Discussion on UE PRS processing behavior", 3GPP TSG-RAN WG4 Meeting # 94-e R4-2000388, Feb. 2020, 6 pages.

* cited by examiner

POSITIONING MEASUREMENT METHOD AND APPARATUS AND COMMUNICATION DEVICE

CROSS-REFERENCE TO RELATED APPLICATIONS

This application is a continuation of International Application No. PCT/CN2021/105408, filed Jul. 9, 2021, which claims priority to Chinese Patent Application No. 202010658220.9, filed Jul. 9, 2020. The entire contents of each of the above-referenced applications are expressly incorporated herein by reference.

TECHNICAL FIELD

This application relates to the field of communications technologies, and in particular, to a positioning measurement method and apparatus and a communication device.

BACKGROUND

In the related art, when a bandwidth of a Positioning Reference Signal (PRS) exceeds a range of a downlink active (DL active) Bandwidth Part (BWP), or a numerology of the PRS is different from that of the DL active BWP, a terminal may perform PRS measurement in a configured measurement gap. However, when the terminal performs PRS measurement in the measurement gap, data transmission cannot be performed in the measurement gap. Therefore, the prior method in which PRS measurement is performed in the measurement gap may cause an interruption of data transmission.

SUMMARY

An objective of embodiments of this application is to provide a positioning measurement method and apparatus and a communication device.

According to a first aspect, a positioning measurement method is provided, applied to a terminal, and the method including:
switching to a target BWP; and
performing PRS measurement in the target BWP.

According to a second aspect, a positioning measurement method is provided, applied to a serving base station, and the method including:
transmitting target signaling to a terminal, where the target signaling is used for the terminal to switch to a target BWP and perform PRS measurement in the target BWP.

According to a third aspect, a positioning measurement method is provided, applied to a location server, and the method including:
receiving a positioning measurement result transmitted by a terminal, where
the positioning measurement result is obtained by the terminal by performing PRS measurement in a target BWP after switching to the target BWP.

According to a fourth aspect, a positioning measurement apparatus is provided, applied to a terminal, and the method including:
a switching module, configured to switch to a target BWP; and
a first measurement module, configured to perform PRS measurement in the target BWP.

According to a fifth aspect, a positioning measurement apparatus is provided, applied to a serving base station, and the method including:
a second transmitting module, configured to transmit target signaling to a terminal, where the target signaling is used for indicating the terminal to switch to a target BWP and perform PRS measurement in the target BWP.

According to a sixth aspect, a positioning measurement apparatus is provided, applied to a location server, and the method including:
a third receiving module, configured to receive a positioning measurement result transmitted by a terminal, where
the positioning measurement result is obtained by the terminal by performing PRS measurement in a target BWP after switching to the target BWP.

According to a seventh aspect, a positioning measurement method is provided, applied to a terminal, and the method including:
obtaining a measurement gap for positioning measurement; and
performing PRS measurement in the measurement gap.

According to an eighth aspect, a positioning measurement apparatus is provided, applied to a terminal, and the method including:
an obtaining module, configured to obtain a measurement gap for positioning measurement; and
a second measurement module, configured to perform PRS measurement in the measurement gap.

According to a ninth aspect, a communication device is provided, including a processor, a memory, and a program or instruction stored in the memory and executable on the processor, where the program or instruction, when executed by the processor, implements the steps of the method according to the first aspect, or implements the steps of the method according to the second aspect, or implements the steps of the method according to the third aspect, or implements the steps of the method according to the seventh aspect.

According to a tenth aspect, a readable storage medium is provided, storing a program or instruction, where the program or instruction, when executed by a processor, implements the steps of the method according to the first aspect, or implements the steps of the method according to the second aspect, or implements the steps of the method according to the third aspect, or implements the steps of the method according to the seventh aspect.

According to an eleventh aspect, a chip is provided, including a processor and a communication interface, where the communication interface is coupled to the processor, and the processor is configured to run a program or instruction to implement the steps of the method according to the first aspect, or implement the steps of the method according to the second aspect, or implement the steps of the method according to the third aspect, or implement the steps of the method according to the seventh aspect.

According to a twelfth aspect, a computer program product is provided, being stored in a readable storage medium, where the computer program product, when executed by at least one processor, implements the steps of the method according to the first aspect, or implements the steps of the method according to the second aspect, or implements the steps of the method according to the third aspect, or implements the steps of the method according to the seventh aspect.

According to a thirteenth aspect, a communication device is provided, configured to perform the steps of the method according to the first aspect, or perform the steps of the method according to the second aspect, or perform the steps of the method according to the third aspect, or implement the steps of the method according to the seventh aspect.

In embodiments of this application, the terminal may switch to the target BWP and perform PRS measurement in the target BWP. Therefore, when performing PRS measurement, the terminal may switch to a suitable target BWP that meets a condition, so that the PRS measurement may be completed without interrupting data transmission.

DETAILED DESCRIPTION

The technical solutions in the embodiments of this application are described below with reference to the accompanying drawings. The described embodiments are merely some rather than all of the embodiments of this application. All other embodiments obtained by a person of ordinary skill in the art based on the embodiments of this application without creative efforts shall fall within the protection scope of this application.

In the specification and claims of this application, terms "first" and "second" are used to distinguish similar objects, but are not used to describe a specific sequence or order. It may be understood that the data used in such a way is interchangeable in proper circumstances, so that the embodiments of this application can be implemented in other sequences than the sequence illustrated or described herein. In addition, objects distinguished by "first" and "second" are usually of a type, and the number of objects is not limited. For example, a first object may be one or more than one. In addition, in the specification and claims, "and/or" means at least one of the connected objects, and the character "/" generally indicates an "or" relationship between associated objects.

It should be noted that, the technology described in this embodiment of this application is not limited to a Long Term Evolution (LTE)/LTE-Advanced (LTE-A) system, but may further be used in other wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" in this embodiment of this application are often used interchangeably, and the described technologies may be used both for the systems and radio technologies mentioned above and may also be used for other systems and radio technologies. However, the following descriptions describe a New Radio (NR) system for the objective of being used as an example, and NR terms are used in most of the descriptions below. These technologies may also be applied to applications other than NR system applications, such as a $6^{th}$ Generation (6G) communication system.

Figure 1:
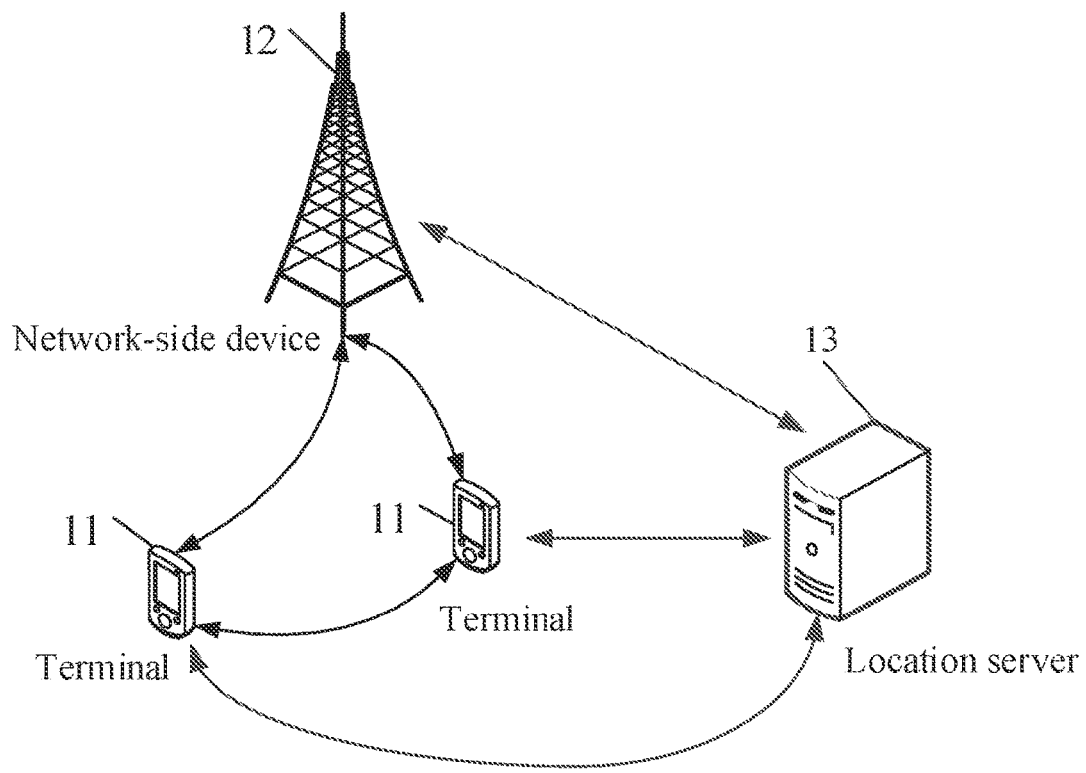
FIG. 1 is a block diagram of a wireless communication system according to an embodiment of this application.

FIG. 1 is a block diagram of a wireless communication system to which an embodiment of this application may be applied. The wireless communication system includes a terminal 11, a network-side device 12, and a location server 13. The terminal 11 may also be referred to as a terminal device or User Equipment (UE). The terminal 11 may be a terminal-side device such as a mobile phone, a tablet computer, a laptop computer, or referred to as a notebook computer, a Personal Digital Assistant (PDA), a palmtop computer, a netbook, an ultra-mobile personal computer (UMPC), a Mobile Internet Device (MID), a wearable device, or Vehicle User Equipment (VUE), and Pedestrian User Equipment (PUE). The wearable device includes: a bracelet, headphones, glasses, or the like. It should be noted that, in this embodiment of this application, a specific type of a terminal 11 is not limited. The network-side device 12 may be a base station. For example, the base station is a serving base station. The base station may be referred to as a node B, an evolved node B, an access point, a Base Transceiver Station (BTS), a radio base station, a radio transceiver, a Basic Service Set (BSS), an Extended Service Set (ESS), a node B, an evolution node B (eNB), a household node B, a household evolution node B, a WLAN access point, a WiFi node, a Transmitting Receiving Point (TRP), a serving cell, a cell, or some other proper terms in the field. Provided that the same technical effect is achieved, the base station is not limited to a specific technical vocabulary. It should be noted that, in this embodiment of this application, only a base station in the NR system is used as an example, but a specific type of the base station is not limited. The location server 13 may exchange information with the terminal 11 and the network-side device 12 to implement corresponding positioning services. In some embodiments, the location server 13 may be a Location Management Function (LMF) in the NR, an Evolved Serving Mobile Location Center (E-SMLC) in LTE, or a location server of a subsequent version.

For the ease of understanding the embodiments of this application, the following contents are first described.

In this embodiment of this application, in some embodiments, a target BWP may be a network-configured BWP, a pre-configured BWP, or a BWP specified in a protocol used for receiving a PRS, that is, a BWP used for measuring the PRS.

In some embodiments, the target BWP may be a positioning-specific BWP, or a positioning BWP. For example, the BWP includes, but is not limited to, the following features, which may be configured by a network or specified in a protocol:

1) The BWP has a relatively large bandwidth (such as 100 M, 200 M, 400 M, or the like), which may be used for performing PRS measurement. For example, when configuring the target BWP, a Sub-Carrier Spacing (SCS) and/or a number of Resource Block (RB) may be relatively great, which may be indicated by a Resource Indicator Value (RIV).

In some embodiments, the bandwidth and SCS of the positioning-specific BWP may be configured to be consistent with a carrier bandwidth and the SCS. For example, referring to Table 1, a carrier of a specific Frequency Range 1 (FR1) supports three types of SCSs, and supports a bandwidth corresponding to a specific number of RBs in Table 1 under a specific SCS, then, three types of positioning-specific BWPs may be configured, which are consistent with the carrier bandwidth and SCS. Similarly, as shown in Table 2, a carrier of a specific FR2 supports two types of SCSs, then, two types of positioning-specific BWPs may be configured, which are consistent with the carrier bandwidth and SCS.

TABLE 1

Transmission bandwidth configuration of RBs ($N_{RB}$) in FR1

| SCS (KHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 70 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|---|
| 15 | 25 | 52 | 79 | 106 | 133 | 160 | 216 | 270 | NA | NA | NA | NA | NA |
| 30 | 11 | 24 | 38 | 51 | 65 | 78 | 106 | 133 | 162 | 189 | 217 | 245 | 273 |
| 60 | NA | 11 | 18 | 24 | 31 | 38 | 51 | 65 | 79 | 93 | 107 | 121 | 135 |

TABLE 2

Transmission bandwidth configuration of in FR1

| SCS (KHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | NA |
| 120 | 32 | 66 | 132 | 264 |

2) The BWP may be configured or used only when the PRS needs to be measured.

3) There is dedicated identification information in the BWP configuration used for distinguishing the BWP from the regular BWP, such as positioning a BWP usage identifier, or a dedicated BWP ID, such as BWP ID>3.

4) The BWP has periodicity and is used for adapting to measurement of a periodic PRS.

5) The BWP has a periodic offset.

6) The BWP has duration configuration, which is used for indicating a continuous effective time of a BWP time domain.

7) A timing duration of a BWP-inactive timer is relatively short, or there is no BWP-inactive timer configuration.

8) The BWP-inactive timer is used for indicating UE to switch to a default BWP or a regular BWP when there is no measurement of a positioning reference signal for a period of time or when there is no measurement and data scheduling (whether there is a service) of a positioning reference signal for a period of time.

In some embodiments, a target BWP may be a regular BWP, such as a BWP used for normal data transmission. If the regular BWP may also meet the requirements of positioning measurement, the regular BWP may also be used for performing positioning measurement.

In this embodiment of this application, in some embodiments, before switching to the target BWP according to the received BWP activation signaling, the terminal may further obtain one or more piece of target BWP configuration information. The target BWP configuration information is configured by a network side, pre-configured, or specified in a protocol.

Scenarios applicable to this embodiment of this application include, but are not limited to, scenarios such as Industrial Internet of Things (IIoT), or the like. Considering a latency requirement in the IIoT positioning, the target BWP may be a pre-configured BWP or a BWP specified in a protocol. For example, a BWP with several fixed bandwidths and/or a numerology is pre-configured or specified as the target BWP. To reduce the latency, there may be only one of a PRS or a positioning frequency layer in the IIoT scenario, and a center frequency of the PRS or the positioning frequency layer is consistent with a center frequency of the BWP configured by a network (such as the current active BWP). Then, when the terminal measures the PRS outside the current active BWP, the terminal only needs to perform the same-frequency BWP adaptation. Therefore, only a BWP with several fixed bandwidths and/or a numerology needs to be pre-configured by a network or specified.

In this embodiment of this application, the BWP configuration information may include at least one of the following parameters:

a BWP identifier (ID);
a BWP sub-carrier spacing (SCS);
a BWP cyclic prefix (CP) type;
a resource indicator value (RIV);
BWP usage, where the BWP usage is used for indicating whether the BWP is the BWP used for measuring a PRS; or
BWP frequency domain location information.

In some embodiments, the BWP sub-carrier spacing and BWP cyclic prefix type may further be referred to as a numerology of the BWP.

In some embodiments, in the BWP usage, the following Information Element (IE): enum{pos} may be used for indicating whether the BWP is a positioning-specific BWP or a regular BWP. Further, if {pos} is configured, the BWP is a BWP dedicated to receiving a PRS, otherwise the BWP is a regular BWP.

In some embodiments, the BWP frequency domain location information may include a starting frequency domain location of the BWP and BWP bandwidth information.

In some embodiments, the BWP configuration information may further include: positioning assistance data; and the positioning assistance data includes at least PRS time frequency domain location information.

Further, in some embodiments, the PRS frequency domain location information is frequency domain information relative to the BWP. That is, the PRS frequency domain location information is not an absolute frequency domain location, but a location relative to a BWP frequency domain location.

In some embodiments, the BWP configuration information may further include: configuration information associated with a downlink channel and/or a downlink signal, for example, configuration information of a Physical Downlink Shared Channel (PDSCH) and/or a Physical Downlink Control Channel (PDCCH) or the like. The downlink channel includes a control channel and/or a data channel. These channels and/or signals may be transmitted on the target BWP.

In some embodiments, in this embodiment of this application, the positioning reference signal PRS may be understood as a reference signal used for positioning, including, but is not limited to, a downlink positioning reference signal PRS, a Synchronization Signal and PBCH block (SSB), a Channel State Information Reference Signal (CSI-RS), a Tracking Reference Signal (TRS), or the like.

In this embodiment of this application, signaling between the location server and the terminal includes, but is not limited to, one of the following:

LTE Positioning Protocol (LPP) signaling, NR Positioning Protocol (NRPP) signaling, a combination of NRPPa and (signaling between gNB and UE), or a combination of LPPa and (signaling between gNB and UE).

In some embodiments, signaling between the gNB and the UE includes, but is not limited to, at least one of the following:

Radio Resource Control (RRC) signaling, a Media Access Control Control Element (MAC CE), Downlink Control Information (DCI), a message 1 (Msg 1), a message 3 (Msg 3), broadcast signaling, paging signaling, or the like.

In some embodiments, signaling between the gNB and the location server includes, but is not limited to, one of the following: NRPPa, LPPa, or the like.

The positioning measurement method provided in this embodiment of this application is described in detail below by using specific embodiments and application scenarios with reference to the accompanying drawings.

Figure 2:
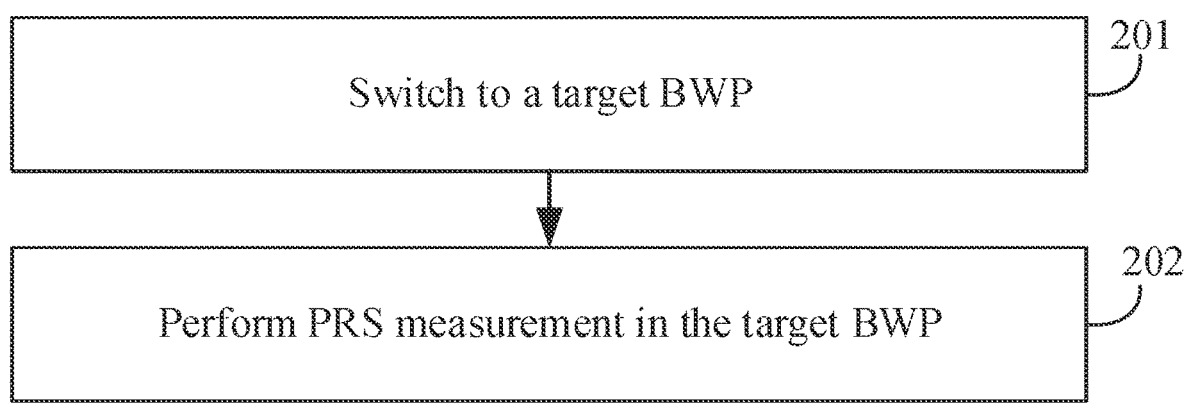
FIG. 2 is a flowchart of a positioning measurement method according to an embodiment of this application.

FIG. 2 is a flowchart of a positioning measurement method according to an embodiment of this application. The method is applied to a terminal. As shown in FIG. 2, the method includes the following steps:

Step 201. Switch to a target BWP.

In this embodiment, the target BWP may be a regular BWP or a positioning-specific BWP. A serving cell in which the target BWP is located may be referred to as a target serving cell. The target serving cell may be a regular or positioning-specific serving cell.

In some embodiments, the target serving cell in which the target BWP is located may be any one of the following: an activated serving cell, a serving cell that is configured but is not activated, or an unconfigured serving cell.

In an implementation, the target serving cell may be one of a Primary cell (Pcell), a Special cell (Spcell), a Primary secondary cell (Pscell), or a Secondary cell (Scell) in a Master Cell Group (MCG) and a Secondary Cell Group (SCG).

For example, the serving cell that is configured but not activated may be a configured scell, but needs to be activated by MAC CE signaling.

In another example, the unconfigured serving cell needs to be added by the gNB through RRC reconfiguration signaling.

It is to be noted that, the serving cell may further be referred to as a Component Carrier (CC) or a carrier. In a case of switching to the target BWP to perform PRS measurement, on the same Orthogonal Frequency Division Multiplexing (OFDM) symbol, the PRS and the downlink channel or signal may be multiplexed to different RBs.

Step 202. Perform PRS measurement in the target BWP.

In this embodiment, when performing PRS measurement, the terminal may perform measurement in the PRS according to the configuration of the PRS. It is to be noted that, the configuration of the PRS may further be understood as configuration of a positioning frequency layer. The measurement on one or several positioning frequency layers performed by the terminal may be switched to the target BWP to be performed.

In some embodiments, the terminal may also perform measurement on a plurality of positioning frequency layers on the target BWP. Correspondingly, a request for the target BWP by the terminal may also be a BWP request obtained by synthesizing based on the configuration of a plurality of positioning frequency layers. Correspondingly, measurement performed on the PRS by the terminal may also be measurement performed on one or several positioning frequency layers.

In this embodiment of this application, the terminal may switch to the target BWP and perform PRS measurement in the target BWP. Therefore, when performing PRS measurement, the terminal may switch to a suitable target BWP that meets a condition, so that the PRS measurement may be completed without interrupting data transmission.

In this embodiment of this application, before performing PRS measurement, the terminal may further receive target signaling transmitted by a serving base station, so as to perform PRS measurement in the target BWP according to the target signaling. It is to be noted that, there may be one or more target BWPs determined according to the target signaling.

In some embodiments, the target signaling may include at least one of the following:

switching signaling for switching a current active BWP to the target BWP, where switching a current active BWP to the target BWP may be understood as: switching a specific active BWP to the target BWP; and considering a case of a plurality of CCs, it may also be switching a plurality of active BWPs to a plurality of target BWPs;

activation signaling for a target serving cell, where for example, the activation signaling may be activating a configured inactive target serving cell (such as scell), and may also be activating a newly added target serving cell;

addition signaling for a target serving cell, where for example, the addition signaling may be adding an scell; or activation signaling for the target BWP, where for the activation of the target BWP, the activation signaling may be activating one or more target BWPs; and for example, switching a first active BWP of the newly activated or newly added serving cell (for example, scell) to the target BWP.

In some embodiments, the target BWP may be the first active BWP (first active DL BWP) in the activated target serving cell, or the target BWP may be the first active BWP (first active DL BWP) in the added target serving cell.

In some embodiments, in a case of performing PRS measurement in the target BWP, the terminal may transmit first request signaling to the serving base station. The first request signaling is used for requesting the terminal to perform (or expect) PRS measurement in the target BWP. It is to be noted that, the "expectation" may also be expressed as a preference. For example, when UE expects to measure the PRS outside the current active BWP, or a PRS whose numerology is different from the current BWP, the UE requests to perform PRS measurement in the target BWP. The target BWP requested by the UE and the target BWP indicated by the serving base station may be the same or different.

In an implementation, the terminal may transmit the first request signaling to the serving base station before receiving the target signaling transmitted by the serving base station.

In some embodiments, the first request signaling may further be used for requesting the serving base station to perform at least one of the following: switching a target BWP, activating a target BWP, activating a target serving cell, adding a target serving cell, or the like.

In some embodiments, the first request signaling may include at least one of the following:

1) switching request signaling for the target BWP, where the switching request signaling may be used for requesting to switch a current active BWP to the target BWP.
2) Activation request signaling for a target serving cell, where for example, the activation request signaling may request to activate a configured but not activated serving cell, or request to activate a newly added target serving cell, or the like.
3) Addition request signaling for a target serving cell, where for example, the addition request signaling may request to add an unconfigured serving cell.
4) Activation request signaling for the target BWP, where for example, the activation request signaling may request to switch a first active BWP of the newly activated or newly added serving cell to the target BWP.
5) A target BWP ID, where for example, the target BWP ID may include a regular BWP ID and/or a positioning-specific BWP ID to which the UE expects to switch.
6) A serving cell ID of a target serving cell.
7) An identifier of a current active BWP that is switched.
8) A serving cell ID of a cell in which a current active BWP that is switched is located.
9) Target BWP configuration information expected by the terminal. In some embodiments, the target BWP configuration information may include, but is not limited to, BWP frequency domain location information, or the like.

For example, the target BWP configuration information may include at least one of the following: a serving cell id in which a BWP is located, BWP starting location information, a BWP bandwidth, a numerology of a BWP, or the like.

10) Target serving cell configuration information expected by the terminal. In some embodiments, the target serving cell configuration information may include, but is not limited to, frequency domain location information of the target serving cell, or the like.

For example, the target serving cell configuration information may include at least one of the following: a frequency band identifier in which a serving cell is located, location information of a point A of a serving cell, serving cell starting location information, a serving cell bandwidth, a sub-carrier spacing, or the like. The point A is a reference point A. That is, the frequency domain location uses the frequency as a reference. For example, when a specific frequency domain location is indicated, the specific frequency domain location may be determined according to N RBs that are higher than the frequency under a specific sub-carrier spacing.

11) Partial or entire PRS configuration information. In some embodiments, the target PRS configuration information may include, but is not limited to, PRS frequency domain information, PRS time domain information, or the like.

For example, the PRS frequency domain information may include, but is not limited to, at least one of the following: positioning frequency layer configuration information, PRS starting location information, PRS bandwidth information, PRS numerology information, a band identifier, a center frequency, or the like.

Further, the positioning frequency layer configuration information may include, but is not limited to, at least one of a positioning frequency layer identifier ID, a point A, an SCS, a bandwidth, a comb size, or the like. The positioning frequency layer may be used for indicating that the target BWP switching or activation request is associated with/ corresponds to the positioning frequency layer. For example, the positioning frequency layer identifier is 1, and the requested target BWP is requested for the positioning frequency layer whose identifier is 1. That is, the request corresponds to/is associated with the positioning frequency layer whose identifier is 1. A request may include a plurality of positioning frequency layer identifiers/configuration, indicating that a requested BWP is related to a plurality of positioning frequency layers. In other words, the UE may perform measurement on a plurality of positioning frequency layers on a target BWP. The positioning frequency layer identifier may be an initially configured positioning frequency layer identifier (such as a positioning frequency layer identifier initially configured by a location server), and may also be corresponding identifiers set only to distinguish different positioning frequency layers when the UE requests the target BWP switching or activation (for example, when requesting target BWP switching or activation for N positioning frequency layers, the positioning frequency layer identifiers are 0, 1, . . . , and N−1).

In another example, the PRS time domain information may include, but is not limited to, at least one of the following: PRS time domain location information, a PRS period and periodic offset, PRS occasion configuration information, PRS repetition configuration information, or the like.

12) Frequency domain location information on which the terminal expects to perform measurement. For example, the frequency domain location information may include, but is not limited to, at least one of the following: a frequency, a sub-carrier spacing, a bandwidth, or the like.
13) Time domain location information on which the terminal expects to perform measurement. For example, the time domain location information may include, but is not limited to, at least one of the following: a period, a periodic offset, a duration, or the like.
14) An effective time or duration of positioning measurement. For example, the effective time or duration may include at least one of a positioning measurement starting time, an end time, a duration, a number of positioning measurement periods, a period duration, or the like.

15) An effective time or duration of positioning reporting. For example, the effective time or duration may include at least one of a positioning reporting starting time, an end time, a duration, a number of positioning reporting periods, a reported period duration, or the like.
16) An effective time of the target BWP. The effective time may be used for assisting the serving base station in determining when to deactivate the target BWP. For example, the effective time may include at least one of a BWP effective starting time, an end time, a duration, or the like (expected by the UE).
17) An effective time of a target serving cell. The effective time may be used for assisting the serving base station in determining when to deactivate the target serving cell. For example, the effective time may include at least one of a serving cell effective starting time, an end time, a duration, or the like (expected by the UE).
18) A priority of a current location service or positioning measurement. The priority may be used for assisting the serving base station in determining whether to accept a corresponding request and/or to determine subsequent actions. For example, if the priority of PRS measurement is high, the serving base station is to switch to the target BWP for PRS measurement, even if signaling overhead or power consumption is increased. In some embodiments, importance of a current location service or positioning measurement. The importance may be used for assisting the serving base station in determining whether to accept a corresponding request and/or to determine subsequent actions. For example, if the importance of PRS measurement is high, the serving base station switches to the target BWP for performing PRS measurement, even if signaling overhead or power consumption is increased.

It is to be noted that, the priority or importance may be divided into a plurality of levels, such as level 0, 1, 2, 3 . . . , where 0 represents the highest level; and the terminal may indicate that the priority or importance is one of these levels.

It is to be noted that, the priority (or importance) of performing downlink positioning reference signal measurement in the target BWP may be indicated by the location server, or determined by the terminal, or pre-configured, or specified in a protocol. For example, when the priority (or importance) of performing downlink positioning reference signal measurement in the target BWP is determined by the terminal, the terminal may determine according to received positioning request information such as quality of service (QoS), which is not limited in this embodiment.

20) A reason for not requesting a measurement gap. For example, the UE does not expect that the time of interruption of data transmission is too long, or there is BWP configuration that meets a condition.
21) A request identifier of a measurement gap. It may be understood that, when the parameter is included, the parameter is used for indicating a serving gNB. If the UE is rejected to perform PRS measurement in the target BWP, a measurement gap may be configured for the serving gNB for PRS measurement. Further, the first request signaling may further include measurement gap configuration information, or the like expected by the UE.

It is to be noted that, in this embodiment of this application, the first request signaling may be transmitted through RRC signaling, for example, may be included in the measurement gap request signaling and transmitted to the serving gNB through the RRC. The first request signaling may be signaling including a request to switch an active BWP to another target BWP, or may be signaling including a request to switch N (N is an integer greater than 1) active BWPs to corresponding N target BWPs. The first request signaling may further include a new BWP activation request. The activation of a new BWP is not a BWP switched from the current active BWP, but is a BWP that needs to first activate or add a scell, and is then activated. The different BWP switching or activation requests may be carried by one piece of signaling, and may also be separately carried by a plurality of pieces of request signaling. For example, each piece of signaling carries a BWP switching or activation request. For example, each BWP switching or activation request corresponds to/is associated with a positioning frequency layer.

In this embodiment of this application, after the first request signaling is transmitted to the serving base station, if the serving base station rejects the first request signaling, a rejection response may be fed back to the terminal. Correspondingly, the terminal may receive the rejection response fed back by the serving base station.

Further, after receiving the rejection response fed back by the serving base station, the terminal may transmit the rejection response to the location server, so that the location server learns that the serving base station rejects the first request signaling.

In some embodiments, the rejection response may include at least one of the following:
1) a rejection response identifier.
2) A reason for rejection. For example, the reason for the rejection includes, but is not limited to, at least one of the target BWP being unavailable, the serving cell in which the target BWP is located being unavailable, or the like.
3) A category of rejection. For example, the category of rejection includes, but is not limited to, at least one of rejecting BWP switching, rejecting scell activation, rejecting scell addition, or the like.
4) Recommended target BWP configuration information. For example, the recommended information includes, but is not limited to, at least one of recommended BWP configuration (for example, a BWP identifier, or the like), serving cell configuration (for example, a serving cell identifier, or the like), or the like.
5) A PRS identifier. The PRS identifier is an identifier (one or more) of a PRS associated with the rejected BWP. For example, the PRS identifier includes, but is not limited to, at least one of a PRS resource ID, a PRS resource set ID, a transmission and receiving point (TRP) ID, a Physical Cell Identifier (PCI), an NR Cell Global Identifier (NCGI), a positioning frequency layer identifier, a band identifier, or the like.
6) A rejected BWP identifier, which indicates that a request associated with the BWP (one or more) is rejected.
7) A rejected serving cell identifier, which indicates a serving cell corresponding to the rejected BWP.
8) Configuration information of the recommended measurement gap. The configuration information may be used for indicating that after the target BWP switching is rejected, the serving gNB recommends the UE to perform PRS measurement in the measurement gap.
9) A request trigger indication for a measurement gap. For example, the request trigger indication may be used for triggering the UE to request the measurement gap to perform PRS measurement when the target BWP request is rejected.

In this embodiment of this application, the terminal may further transmit feedback information to the location server, where the feedback information includes: first indication information used for indicating whether the terminal has transmitted first request signaling to a serving base station. In this way, by the first indication information, the location server may learn whether the terminal has transmitted the first request signaling to the serving base station, so as to request to perform PRS measurement in the target BWP.

In some embodiments, in a case that the first indication information indicates that the terminal has transmitted the first request signaling to the serving base station, the feedback information may further include at least one of the following:

1) partial or entire target BWP configuration information, which may include, but is not limited to, BWP frequency domain location information, or the like.

For example, the target BWP configuration information may include at least one of the following: a serving cell id in which a BWP is located, BWP starting location information, a BWP bandwidth, a numerology of a BWP, or the like.

2) Partial or entire PRS configuration information associated with target BWP configuration information may include, but is not limited to, PRS frequency domain information, PRS time domain information, or the like.

For example, the PRS frequency domain information may include, but is not limited to, at least one of the following: positioning frequency layer configuration information, PRS starting location information, PRS bandwidth information, PRS numerology information, a band identifier, a center frequency, or the like. The PRS time domain information may include, but is not limited to, at least one of the following: PRS time domain location information, a PRS period and periodic offset, PRS occasion configuration information, PRS repetition configuration information, or the like.

In some embodiments, in addition to the first indication information, the feedback information may further include: second indication information used for indicating whether the terminal has requested a measurement gap from the serving base station, where the measurement gap is used for performing PRS measurement. For example, the UE feeds back to the serving gNB that when performing PRS measurement, the terminal does not request the measurement gap, nor does the terminal request the target BWP to perform PRS measurement.

In this embodiment of this application, in a case of performing PRS measurement in the target BWP, the terminal may further transmit second request signaling to the serving base station. The second request signaling may be used for indicating that the terminal stops performing PRS measurement on the target BWP.

In an implementation, after transmitting the first request signaling to the serving base station, the terminal may transmit the second request signaling to the serving base station.

Further, the second request signaling may further be used for requesting the serving base station to perform at least one of the following operations:

switching the target BWP to a default or regular BWP;
deactivating a target serving cell;
deleting or releasing a target serving cell; or
deactivating the target BWP.

In some embodiments, after performing PRS measurement, the terminal may further receive at least one of the following signaling transmitted by the serving base station:

deletion signaling or release signaling for a target serving cell;
deactivation signaling for a target serving cell;
switching signaling for switching the target BWP to a default or regular BWP; or
deactivation signaling for the target BWP.

In this way, by means of these signaling, the terminal may be restored to an original state, so as to ensure a smooth subsequent communication process.

In this embodiment of this application, after performing PRS measurement, the terminal may further report a positioning measurement result to at least one of a location server or a serving base station. In this way, the location server and/or the serving base station may learn a positioning measurement result immediately.

In some embodiments, the positioning measurement result may include at least one of the following:

1) indication information used for indicating whether the positioning measurement result is obtained through a requested target BWP.

For example, if the terminal requests a target BWP, the positioning measurement result may further include information indicating whether the target BWP is activated by the serving gNB or rejected by the serving gNB.

2) A PRS identifier corresponding to the positioning measurement result.

In some embodiments, the PRS identifier corresponding to the positioning measurement result is the identifier of the PRS measured in the target BWP, and is used for indicating which PRS measurement results are obtained by performing measurement on the target BWP. The PRS identifier includes, but is not limited to, at least one of a PRS resource ID, a PRS resource set ID, a TRP ID, a PCI, an NCGI, a positioning frequency layer identifier, a band identifier, or the like.

For example, the PRS identifier may be one or more positioning frequency layer identifiers that perform measurement on the target BWP.

3) Partial or entire BWP configuration information corresponding to the positioning measurement result.

In some embodiments, the partial or entire BWP configuration information includes at least one of the following:

an identifier of a BWP performing PRS measurement.
An identifier of a serving cell in which the BWP is located.

The BWP frequency domain location information includes, but is not limited to, at least one of a BWP bandwidth, BWP starting location information, a serving cell starting location, frequency domain location information of a point A of a serving cell, a BWP starting location absolute frequency ARFCN, a BWP numerology (such as an SCS or a CP type), and a band on which the BWP is located, or the like. For example, the BWP frequency domain location information may be relative frequency domain location information relative to a point A of a serving cell in which the BWP is located, and may also be relative frequency domain location information relative to a point A of an associated positioning frequency layer, or absolute frequency domain location information (for example, a location represented by an Absolute Radio Frequency Channel Number (ARFCN)).

Indication information used for indicating whether the BWP corresponding to the positioning measurement result is the target BWP. In addition, the indication information may also be understood as being used for indicating whether a BWP corresponding to a positioning measurement result is a switched BWP or a newly activated BWP.

Indication information used for indicating whether PRS measurement is completed in a positioning-specific BWP.

Indication information used for indicating whether PRS measurement is completed in a positioning-specific serving cell.

4) Indication information used for indicating whether the terminal requests a measurement gap may indicate at least one of the following:

UE does not request a measurement gap; or

UE requests a measurement gap, but a measurement gap is not configured for a serving gNB.

It is to be noted that, for a positioning measurement result including BWP configuration information, it may be implicitly indicated that the positioning measurement result is not obtained by performing measurement in the measurement gap. If the terminal does not request the measurement gap and does not request the target BWP, the terminal may further report information indicating that the measurement gap is not requested and the target BWP is not requested in the positioning measurement result.

In this embodiment of this application, in a case that the positioning measurement result includes measurement results of a plurality of serving cells (CCs), the terminal may report respective measurement results to serving cells respectively when reporting the positioning measurement results. In this way, it is convenient for the serving cell to obtain the respective measurement result.

For example, if the positioning measurement result includes a measurement result 1 of a CC1, a measurement result 2 of a CC2, and a measurement result 3 of a CC3, the terminal reports the measurement result 1 for the CC1, reports the measurement result 2 for the CC2, and reports the measurement result 3 for the CC3.

In some embodiments, the measurement result reported for each serving cell may include at least one of the following:

1) BWP configuration information used for measuring a PRS. For the content that may be included in the BWP configuration information, reference may be made to the foregoing content.

2) An identifier of a PRS measured in the BWP. For the content that may be included in the PRS identifier, reference may be made to the foregoing content.

3) A frequency domain sampling point measurement result. The frequency domain sampling point measurement result may be used for assisting the location server or serving gNB to perform frequency bundling/stitching processing on PRSs on different serving cells or frequency layers. For example, a complete or original frequency channel sampling result, or a down-sampled frequency domain channel sampling result, or the like may be reported.

4) A measurement result after each serving cell performs PRS measurement. For example, the Time of Arrival (ToA) after PRS measurement in each serving cell, a Reference Signal Time Difference (RSTD), or the like.

5) Frequency domain location information used for measuring a PRS.

For example, the frequency domain location information may be a starting point and a bandwidth of an absolute frequency domain location of the measured PRS, and may also be a starting point and a bandwidth of the measured PRS on the target BWP, such as a PRB location, or the like.

In another example, the frequency domain location information of the measured PRS may be relative frequency domain location information relative to a point A of the positioning frequency layer, and may also be relative frequency domain location information relative to the point A of the serving cell in which the associated BWP is located, or absolute frequency domain location information.

In an implementation, assuming that N positioning frequency layers are configured for the location server, when performing PRS measurement, the UE respectively performs measurement in N BWPs corresponding to N serving cells. Further, if the N positioning frequency layers are configured at the same moment, and the UE capability supports simultaneous processing, the UE may simultaneously perform PRS measurement in N active BWPs corresponding to the N serving cells.

In another implementation, when the UE reports the respective measurement result in each frequency layer, serving cell, or BWP, the measurement result includes channel frequency sampling point information, RSTD, or ToA, or the like corresponding to each frequency layer, serving cell, or BWP.

In this embodiment of this application, before performing PRS measurement, the terminal may further report the terminal capability to at least one of the location server or the serving base station, so that the location server and/or the serving base station accurately learns the terminal capability. In some embodiments, the terminal capability may include at least one of the following:

whether to support performing PRS measurement in a manner of BWP switching;

whether to support performing PRS measurement in a measurement gap;

whether to support a positioning-specific BWP;

whether to support a positioning-specific serving cell;

whether to support simultaneously measuring or measuring once PRSs of a plurality of positioning frequency layers;

whether to support simultaneously measuring PRSs of a plurality of serving cells or PRSs of a plurality of BWPs;

whether to support simultaneously requesting a plurality of target BWPs;

whether to support simultaneously switching a plurality of BWPs;

whether to support simultaneously activating a plurality of BWPs;

a PRS measuring capability of the terminal in a case that the BWP is configured to perform PRS measurement (or a measurement gap is not configured);

whether to support requesting the target BWP for PRS measurement;

whether to support requesting a measurement gap for PRS measurement;

whether to support simultaneously configuring a measurement gap and performing target BWP switching for PRS measurement; or whether to support simultaneously configuring a measurement gap and performing target BWP activation for PRS measurement.

In an implementation, the terminal does not expect to be simultaneously configured with the measurement gap and the target BWP switching or activation to perform PRS measurement.

In this embodiment of this application, a terminal behavior may be indicated by a network, specified in a protocol, or selected by a terminal, or the like, which is not limited. In addition to including performing PRS measurement on the switched target BWP, the terminal behavior may further include, but is not limited to, the following terminal behaviors, which are described in detail below.

In some embodiments, in a case that a measurement gap is configured for the terminal, and the target serving cell is activated or deactivated in the measurement gap, the terminal may perform PRS measurement in the measurement gap. In this case, a priority of the measurement gap is higher than a priority of the activation and deactivation of the serving cell. In other words, during the measurement gap, the terminal does not expect to activate or deactivate the serving cell.

In addition, if a measurement gap is configured for the terminal, and the target serving cell is activated or deactivated in the measurement gap, the terminal may further interrupt PRS measurement in the measurement gap. For example, the PRS has a plurality of measurement period instances, and PRS measurement of a specific measurement period instance is interrupted. In this case, a priority of the measurement gap is lower than a priority of the activation and deactivation of the serving cell. In other words, during the activation or deactivation of the serving cell, the terminal does not expect to be configured with a measurement gap to perform PRS measurement, or the terminal does not expect to perform PRS measurement.

In an implementation, during positioning measurement, the terminal does not expect to be simultaneously configured with the measurement gap and the activation/deactivation of the serving cell.

In some embodiments, when the terminal receives deactivation signaling for a target serving cell, and the deactivation signaling for the target serving cell includes an indication for configuration of a measurement gap, according to the deactivation signaling for the target serving cell, the terminal may perform PRS measurement in the configured measurement gap or continue performing PRS measurement, to ensure the smooth execution of PRS measurement.

In some embodiments, when the terminal receives deactivation signaling for a target serving cell, and the deactivation signaling for the target serving cell is used for triggering the terminal to request a measurement gap, according to the deactivation signaling for the target serving cell, the terminal may request a measurement gap used for performing PRS measurement from the serving base station, so as to continue performing PRS measurement.

In some embodiments, when the terminal receives activation signaling for a target serving cell, and the activation signaling for the target serving cell includes semi-persistent PRS activation or trigger signaling, the terminal may activate or trigger measurement performed on the semi-persistent PRS while activating the target serving cell according to the activation signaling for the target serving cell. In some embodiments, when the terminal receives activation signaling for a target serving cell, and the activation signaling for the target serving cell includes aperiodic PRS activation or trigger signaling, the terminal may activate or trigger measurement performed on the semi-persistent PRS while activating the target serving cell according to the activation signaling for the target serving cell.

In some embodiments, when the terminal receives activation signaling for a target serving cell, and the activation signaling for the target serving cell includes semi-persistent Sounding Reference Signal (SRS) activation or trigger signaling, the terminal may activate or trigger measurement performed on the semi-persistent SRS while activating the target serving cell according to the activation signaling for the target serving cell. In some embodiments, when the terminal receives activation signaling for a target serving cell, and the activation signaling for the target serving cell includes aperiodic SRS activation or trigger signaling, the terminal may activate or trigger measurement performed on the aperiodic SRS while activating the target serving cell according to the activation signaling for the target serving cell. The semi-persistent SRS and the aperiodic SRS are uplink positioning reference signals.

It is to be noted that, when a terminal report transmission/reception (RX-TX) measurement result is configured for the network, the activation signaling for the target serving cell may be used for activating the reception of semi-persistent/aperiodic PRS, and may also be used for activating the transmission of the semi-persistent/aperiodic SRS.

In some embodiments, before performing PRS measurement, the terminal may further receive third indication information from at least one of the location server or the serving base station. The third indication information is used for indicating whether the terminal is allowed to request BWP switching for PRS measurement. In this way, by means of the third indication information, the terminal may learn whether the location server and/or the serving base station allow the terminal to request the target BWP.

It is to be noted that, the third indication information may be understood as a switch. In a case that there is the third indication information, the UE may request the BWP switching or the measurement gap when the UE expects to measure a PRS outside the active BWP or a PRS whose numerology is different from that of the active BWP. In a case that there is no third indication information, the UE may only request the measurement gap.

In some embodiments, before performing PRS measurement, when the terminal supports requesting the measurement gap and supports requesting the target BWP switching or activation, the terminal may receive fourth indication information from at least one of the location server or the serving base station. The fourth indication information is used for indicating a priority of the measurement gap and the BWP switching, and requesting the measurement gap from the location server according to the fourth indication information, and performing PRS measurement in the measurement gap, or requesting the target BWP switching or activation from the location server according to the fourth indication information, and performing PRS measurement on the target BWP.

It is to be noted that, in addition to being indicated by the network, the priority may further be determined by one of protocol specification, pre-configuration, pre-definition, or terminal selection. For example, the protocol specifies that the priority of the measurement gap request is higher than the priority of the BWP switching, or the priority of the measurement gap request is lower than the priority of the BWP switching, or the priority of the measurement gap request is the same as the priority of the BWP switching.

In this embodiment of this application, the UE performs PRS measurement on the target BWP, which may at least include the following cases:
  1. The UE does not transmit a request to the target BWP, and the serving gNB directly triggers the target BWP switching/activation according to at least a part of the PRS configuration information.
  2. When the UE transmits a request, the priority of the measurement gap is higher than or the same as the priority of the target BWP switching/activation. The UE first transmits a request to the serving gNB to perform PRS measurement in the measurement gap, but the serving gNB rejects the measurement gap configuration request. In this case, there are one of the following two cases:

1) the serving gNB directly triggers the target BWP switching/activation; or
2) the UE continues requesting to perform measurement in the target BWP, and the request is not rejected by the serving gNB, and the UE performs PRS measurements on the target BWP.

In some embodiments, the UE receives the signaling transmitted by the serving gNB before requesting the target BWP to perform measurement. The signaling is used for triggering the UE to request the target BWP switching/activation. The signaling may further be used for carrying the measurement gap configuration rejection information.

In some embodiments, when the UE does not receive the measurement gap configuration, the UE transmits a request to the serving gNB to perform measurement in the target BWP.

3. When the UE transmits a request, the priority of the measurement gap is lower than or the same as the priority of the target BWP switching/activation. The UE transmits a request to the serving gNB to perform PRS measurement in the target BWP, and the request is not rejected by the serving gNB. If the serving gNB rejects the target BWP switching or activation, the measurement gap configuration includes one of the following:
1) the serving gNB is directly configured with the measurement gap so that the UE performs PRS measurement; or
2) the UE continues requesting to perform measurement in the measurement gap.

In some embodiments, the UE receives the signaling transmitted by the serving gNB before requesting the measurement gap to perform measurement. The signaling is used for triggering the UE to request the measurement gap to perform PRS measurement. The signaling may further be used for carrying the target BWP switching/activation configuration rejection information.

In some embodiments, when the UE receives the target BWP switching/activation signaling, the UE transmits a request to the serving gNB to perform measurement in the target BWP.

4. When the UE transmits a request, the location server or the serving gNB indicates that the UE may only request the target BWP switching/activation. The UE transmits a request to the serving gNB to perform PRS measurement in the target BWP, and the request is not rejected by the serving gNB.

5. The UE reporting capability only supports performing PRS measurement in the target BWP, and does not support performing PRS measurement in the measurement gap. The UE transmits a request to the serving gNB to perform PRS measurement in the target BWP, and the request is not rejected by the serving gNB.

Figure 3:
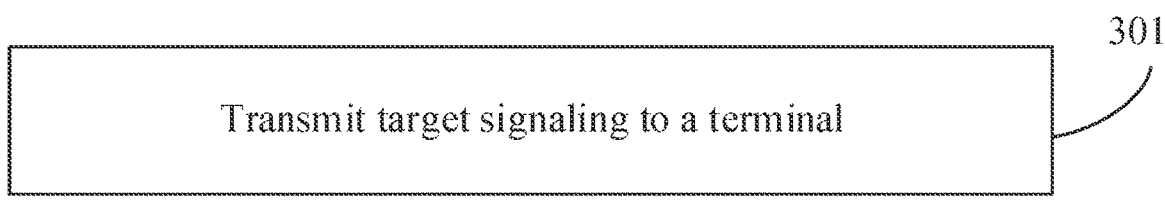
FIG. 3 is a flowchart of another positioning measurement method according to an embodiment of this application.

FIG. 3 is a flowchart of another positioning measurement method according to an embodiment of this application. The method is applied to a serving base station (or a serving cell). As shown in FIG. 3, the method includes the following steps:

Step 301. Transmit target signaling to a terminal.
the target signaling is used for indicating the terminal to switch to a target BWP and perform PRS measurement in the target BWP.

Therefore, by transmitting the target signaling to the terminal, when performing PRS measurement, the terminal may switch to a suitable target BWP that meets a condition to be implemented, so that PRS measurement may be completed without interrupting data transmission.

In this embodiment of this application, before transmitting the target signaling to the terminal, the serving base station may receive the partial or entire PRS configuration information transmitted by the location server, and transmit the target signaling to the terminal according to the partial or entire PRS configuration information.

In some embodiments, the target signaling includes at least one of the following:
switching signaling for switching a current active BWP to the target BWP;
activation signaling for a target serving cell;
addition signaling for a target serving cell; or
activation signaling for the target BWP.

In some embodiments, before transmitting the target signaling to the terminal, the serving base station may receive the first request signaling transmitted by the terminal, where the first request signaling is used for indicating that the terminal is to perform PRS measurement in the target BWP. For the content that is included in the first request signaling, reference may be made to the foregoing content.

Further, after receiving the first request signaling transmitted by the terminal, the serving base station may further transmit a rejection response to at least one of the terminal or the location server, where
the rejection response includes at least one of the following:
a rejection response identifier:
a reason for rejection;
a category of rejection;
recommended target BWP configuration information;
a positioning frequency layer identifier;
a rejected BWP identifier;
a rejected serving cell identifier;
recommended configuration information of a measurement gap; or
a request trigger indication for a measurement gap.

In some embodiments, after receiving the first request signaling transmitted by the terminal, the serving base station may receive the second request signaling transmitted by the terminal, where the second request signaling is used for indicating that the terminal is to stop performing PRS measurement in the target BWP.

Further, the second request signaling is further used for requesting the serving base station to perform at least one of the following operations:
switching the target BWP to a default or regular BWP;
deactivating a target serving cell;
deleting or releasing a target serving cell; or
deactivating the target BWP.

In some embodiments, the serving base station may further transmit at least one of the following signaling to the terminal:
deletion signaling or release signaling for a target serving cell;
deactivation signaling for a target serving cell;
switching signaling for switching the target BWP to a default or regular BWP; or
deactivation signaling for the target BWP.

In some embodiments, the serving base station may further receive a positioning measurement result reported by the terminal, where the positioning measurement result is obtained by the terminal by performing PRS measurement in the target BWP.

In some embodiments, the serving base station may further receive a terminal capability reported by the terminal, where the terminal capability includes at least one of the following:
- whether to support performing PRS measurement in a manner of BWP switching;
- whether to support performing PRS measurement in a measurement gap;
- whether to support a positioning-specific BWP;
- whether to support a positioning-specific serving cell;
- whether to support simultaneously measuring PRSs of a plurality of positioning frequency layers;
- whether to support simultaneously measuring PRSs of a plurality of serving cells or PRSs of a plurality of BWPs;
- whether to support simultaneously requesting a plurality of target BWPs;
- whether to support simultaneously switching a plurality of BWPs;
- whether to support simultaneously activating a plurality of BWPs;
- a PRS measuring capability of the terminal in a case that the BWP is configured to perform PRS measurement;
- whether to support requesting the target BWP for PRS measurement;
- whether to support requesting a measurement gap for PRS measurement;
- whether to support simultaneously configuring a measurement gap and performing target BWP switching for PRS measurement; or
- whether to support simultaneously configuring a measurement gap and performing target BWP activation for PRS measurement.

Figure 4:
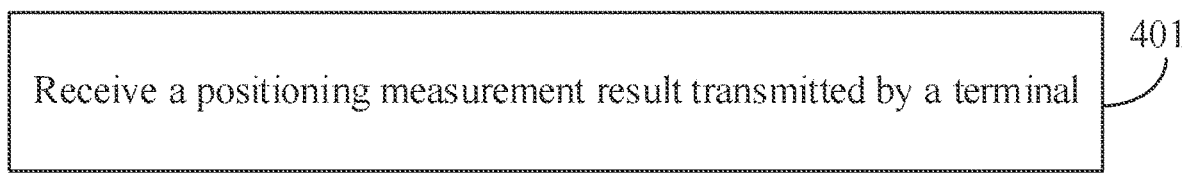
FIG. 4 is a flowchart of another positioning measurement method according to an embodiment of this application.

FIG. 4 is a flowchart of another positioning measurement method according to an embodiment of this application. The method is applied to a location server. As shown in FIG. 4, the method includes the following steps:

Step 401. Receive a positioning measurement result transmitted by a terminal.

the positioning measurement result is obtained by the terminal by performing PRS measurement in a target BWP after switching to the target BWP.

In this embodiment of this application, the location server may receive from the terminal the positioning measurement result obtained by performing PRS measurement in the target BWP, so that the PRS measurement may be completed without interrupting data transmission.

In some embodiments, before receiving the positioning measurement result transmitted by the terminal, the location server may further transmit the partial or entire PRS configuration information to the serving base station, where the partial or entire PRS configuration information includes at least one of the following:
- PRS frequency domain information;
- PRS time domain information;
- an effective time or duration of positioning measurement;
- an effective time or duration of positioning reporting.

In some embodiments, before receiving the positioning measurement result transmitted by the terminal, the location server may further receive feedback information transmitted by the terminal, where the feedback information includes: first indication information used for indicating whether the terminal has transmitted first request signaling to a serving base station; and the first request signaling is used for indicating that the terminal is to perform PRS measurement in the target BWP.

In some embodiments, before receiving the positioning measurement result transmitted by the terminal, the location server may further receive a rejection response transmitted by at least one of the terminal or the serving base station, where the rejection response corresponds to first request signaling transmitted by the terminal to the serving base station, and the first request signaling is used for indicating that the terminal is to perform PRS measurement in the target BWP. For the content that is included in the rejection response and the first request signaling, reference may be made to the foregoing content, and details are not repeated herein.

In some embodiments, after receiving the rejection response, according to the rejection response, the location server may further perform at least one of the following:
- restoring PRS configuration information; for example, restoring on demand PRS configuration to the regular PRS configuration, where the regular PRS configuration includes a case that no PRS is transmitted in some cases;
- modifying PRS configuration information; for example, according to the feedback of the serving gNB, re-adjusting the configuration of the on demand PRS to match a requirement of the gNB;
- transmitting determined PRS configuration information through signaling (such as LPP) to the terminal; for example, the UE may receive the PRS according to the determined PRS configuration;
- transmitting determined PRS configuration information through signaling (such as LPP) to a plurality of base stations (gNBs) participating in PRS positioning; for example, a plurality of gNBs participating in positioning may transmit the PRS according to the determined PRS configuration;
- adjusting an expected positioning requirement; for example, the positioning requirement may be reported to a higher-layer network node;
- adjusting a performance indicator of the terminal; for example, the performance indicator may be reported to a higher-layer network node;
- reporting information about and a reason for a failure of meeting the positioning requirement to an upper-layer network node; for example, a reason is that a gap is not configured for the serving gNB and/or the target BWP switching/activation is not configured for the gNB; or
- transmitting measurement gap request information to the serving gNB, where the request information is used for indicating that the UE performs PRS measurement in the measurement gap. In some embodiments, the measurement gap request information further includes at least measurement gap configuration information, or the like.

In some embodiments, before receiving the positioning measurement result transmitted by the terminal, the location server may further receive the terminal capability reported by the terminal, so as to learn the terminal capability. For the reported terminal capability, reference may be made to the foregoing content, and details are not repeated herein.

Figure 5A:
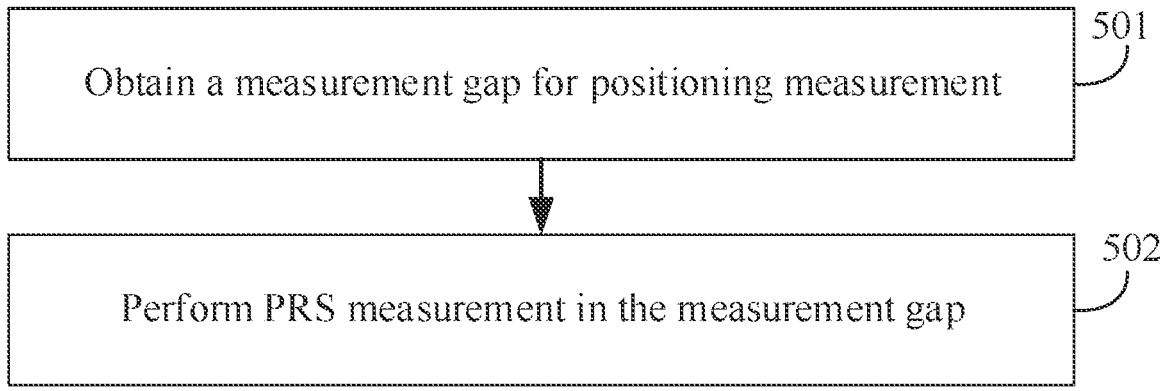
FIG. 5A is a flowchart of another positioning measurement method according to an embodiment of this application.

FIG. 5A is a flowchart of another positioning measurement method according to an embodiment of this application. The method is applied to a terminal. As shown in FIG. 5A, the method includes the following steps:

Step 501. Obtain a measurement gap for positioning measurement.

It is to be noted that, to complete positioning, the terminal generally needs to measure PRSs transmitted by a plurality of cells by broadcasting. To ensure high-precision positioning, a PRS with a relatively large bandwidth is configured for a network-side device. Generally, the larger the PRS bandwidth is, the higher the positioning accuracy is. The PRS with a large bandwidth sometimes exceeds a range of an active BWP on which the terminal is currently working. Therefore, in order for the terminal to measure the PRS outside the active BWP, the terminal is allowed to measure the PRS outside the active BWP in a measurement gap.

In an implementation, the terminal may transmit request signaling to the serving base station to request to be configured with the measurement gap. The serving base station decides how to configure the measurement gap, and then, delivers the configuration of the measurement gap to the terminal. The terminal may measure the PRS in the configured measurement gap.

Step 502. Perform PRS measurement in the measurement gap.

In this embodiment of this application, the terminal may obtain the measurement gap for positioning measurement, and perform PRS measurement in the measurement gap; and therefore, PRS measurement performed by the terminal may be implemented. Especially, the terminal may measure the PRS outside the active BWP in the measurement gap.

In this embodiment of this application, in some embodiments, when a measurement gap is configured for the terminal, and the serving cell is activated or deactivated in the measurement gap, the terminal may perform PRS measurement in the measurement gap. In this case, a priority of the measurement gap is higher than a priority of the activation and deactivation of the serving cell. In other words, during the measurement gap, the terminal does not expect to activate or deactivate the serving cell.

In addition, if a measurement gap is configured for the terminal, and the serving cell is activated or deactivated in the measurement gap, the terminal may further interrupt PRS measurement in the measurement gap. For example, the PRS has a plurality of measurement period instances, and PRS measurement of a specific measurement period instance is interrupted. In this case, a priority of the measurement gap is lower than a priority of the activation and deactivation of the serving cell. In other words, during the activation or deactivation of the serving cell, the terminal does not expect to be configured with a measurement gap to perform PRS measurement, or the terminal does not expect to perform PRS measurement.

In an implementation, during positioning measurement, the terminal does not expect to be simultaneously configured with the measurement gap and the activation/deactivation of the serving cell.

in some embodiments, the terminal may perform PRS measurement in the configured measurement gap according to activation or deactivation signaling for the serving cell in a case that configuration of the measurement gap is carried in the activation or deactivation signaling for the serving cell, so as to ensure the smooth execution of PRS measurement.

In some embodiments, when the requesting a measurement gap for the terminal may be triggered by the activation or deactivation of the serving cell, the terminal may obtain the activation or deactivation signaling for the target serving cell, and request a measurement gap from the serving base station according to the activation or deactivation signaling for the serving cell, so as to perform PRS measurement in the requested measurement gap.

It is to be noted that, in the positioning measurement method provided in this embodiment of this application, an execution entity may be a positioning measurement apparatus, or a control module in the positioning measurement apparatus used for performing the positioning measurement method. In this embodiment of this application, the positioning measurement apparatus performing the positioning measurement method is used as an example to describe the positioning measurement apparatus provided in this application.

Figure 5B:
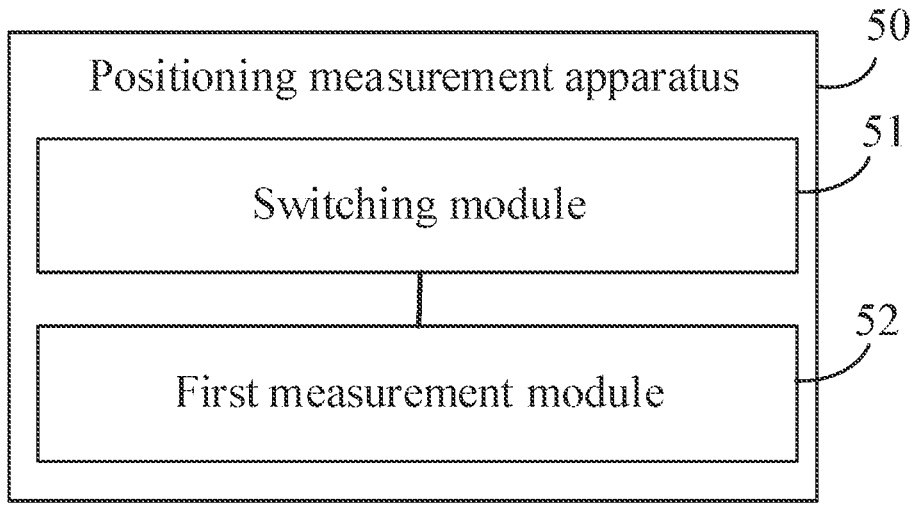
FIG. 5B is a schematic structural diagram of a positioning measurement apparatus according to an embodiment of this application.

FIG. 5B is a schematic structural diagram of a positioning measurement apparatus according to an embodiment of this application, which is applied to a terminal. As shown in FIG. 5B, the positioning measurement apparatus 50 includes:
a switching module 51, configured to switch to a target BWP; and
a first measurement module 52, configured to perform PRS measurement in the target BWP.

In some embodiments, a target serving cell in which the target BWP is located is any one of the following:
an activated serving cell, a serving cell that is configured but is not activated, or an unconfigured serving cell.

In some embodiments, the positioning measurement apparatus 50 further includes:
a first receiving module, configured to receive target signaling transmitted by a serving base station, where the target signaling includes at least one of the following:
switching signaling for switching a current active BWP to the target BWP;
activation signaling for a target serving cell;
addition signaling for a target serving cell; or
activation signaling for the target BWP.

In some embodiments, the positioning measurement apparatus 50 further includes:
a first transmitting module, configured to transmit first request signaling to a serving base station, where the first request signaling is used for indicating that the terminal is to perform PRS measurement in the target BWP.

In some embodiments, the first request signaling is further used for requesting the serving base station to perform at least one of the following:
switching the target BWP;
activating the target BWP;
activating a target serving cell; or
adding a target serving cell.

In some embodiments, for the content that is included in the first request signaling, reference may be made to the description in the embodiment shown in FIG. 2, and details are not repeated herein.

In some embodiments, the first receiving module is further configured to receive a rejection response fed back by the serving base station. For the content that is included in the rejection response, reference may be made to the description in the embodiment shown in FIG. 2, and details are not repeated herein.

In some embodiments, the first transmitting module is further configured to transmit feedback information to a location server, where
the feedback information includes: first indication information used for indicating whether the terminal has transmitted the first request signaling to the serving base station.

In some embodiments, in a case that the first indication information indicates that the terminal has transmitted the first request signaling to the serving base station, the feedback information further includes at least one of the following:
partial or entire target BWP configuration information; or
partial or entire PRS configuration information associated with target BWP configuration information.

In some embodiments, the feedback information further includes: second indication information used for indicating whether the terminal has requested a measurement gap from the serving base station, where the measurement gap is used for performing PRS measurement.

In some embodiments, the first transmitting module is further configured to transmit the rejection response to a location server.

In some embodiments, the target BWP is a first active BWP in an activated target serving cell; or
the target BWP is a first active BWP in an added target serving cell.

In some embodiments, the first transmitting module is further configured to transmit second request signaling to a serving base station, where the second request signaling is used for indicating that the terminal is to stop performing PRS measurement in the target BWP.

Further, the second request signaling is further used for requesting the serving base station to perform at least one of the following operations:
switching the target BWP to a default or regular BWP;
deactivating a target serving cell;
deleting or releasing a target serving cell; or
deactivating the target BWP.

In some embodiments, the first receiving module is further configured to receive at least one of the following signaling transmitted by the serving base station:
deletion signaling or release signaling for a target serving cell;
deactivation signaling for a target serving cell;
switching signaling for switching the target BWP to a default or regular BWP; or
deactivation signaling for the target BWP.

In some embodiments, the positioning measurement apparatus 50 further includes:
a reporting module, configured to report a positioning measurement result to at least one of a location server or a serving base station.

In some embodiments, the positioning measurement result includes at least one of the following:
indication information used for indicating whether the positioning measurement result is obtained through a requested target BWP;
a PRS identifier corresponding to the positioning measurement result;
partial or entire BWP configuration information corresponding to the positioning measurement result; or
indication information used for indicating whether the terminal has requested a measurement gap.

In some embodiments, for the content that is included in the partial or entire BWP configuration information, reference may be made to the description in the embodiment shown in FIG. 2, and details are not repeated herein.

In some embodiments, when the positioning measurement result includes measurement results of a plurality of serving cells, the reporting module is further configured to report respective measurement results for serving cells.

In some embodiments, for the content that is included in the measurement result of each serving cell, reference may be made to the description in the embodiment shown in FIG. 2, and details are not repeated herein.

In some embodiments, the reporting module is further configured to report a terminal capability to at least one of a location server or a serving base station. For the content that is included in the terminal capability, reference may be made to the description in the embodiment shown in FIG. 2, and details are not repeated herein.

In some embodiments, the positioning measurement apparatus 50 further includes:
a first execution module, configured to perform PRS measurement in the measurement gap.

In some embodiments, the first execution module is further configured to perform, when the terminal receives deactivation signaling for a target serving cell, and the deactivation signaling for the target serving cell includes an indication for configuration of a measurement gap, PRS measurement in the configured measurement gap according to the deactivation signaling for the target serving cell.

In some embodiments, the first execution module is further configured to, when the terminal receives deactivation signaling for a target serving cell, and the deactivation signaling for the target serving cell is used for triggering the terminal to request a measurement gap, according to the deactivation signaling for the target serving cell, request a measurement gap used for performing PRS measurement from the serving base station.

In some embodiments, if the activation signaling for the target serving cell includes semi-persistent PRS activation or trigger signaling, the first execution module is further configured to activate or trigger measurement performed on the semi-persistent PRS while activating the target serving cell according to the activation signaling for the target serving cell.

In some embodiments, if the activation signaling for the target serving cell includes aperiodic PRS activation or trigger signaling, the first execution module is further configured to activate or trigger measurement performed on the aperiodic PRS while activating the target serving cell according to the activation signaling for the target serving cell.

In some embodiments, if the activation signaling for the target serving cell includes semi-persistent SRS activation or trigger signaling, the first execution module is further configured to activate or trigger measurement performed on the semi-persistent SRS while activating the target serving cell according to the activation signaling for the target serving cell.

In some embodiments, if the activation signaling for the target serving cell includes aperiodic SRS activation or trigger signaling, the first execution module is further configured to activate or trigger measurement performed on the aperiodic SRS while activating the target serving cell according to the activation signaling for the target serving cell.

In some embodiments, the first receiving module is further configured to receive third indication information from at least one of a location server or a serving base station, where the third indication information is used for indicating whether the terminal is allowed to request BWP switching for PRS measurement.

In some embodiments, when the terminal supports requesting a measurement gap and supports requesting target BWP switching or activation, the first receiving module is further configured to receive fourth indication information from at least one of a location server or a serving base station, where the fourth indication information is used for indicating a priority of the measurement gap and BWP switching; and
the first execution module is further configured to, request a measurement gap from the location server to perform PRS measurement according to the fourth indication information, and perform PRS measurement in the measurement gap; or request the target BWP switching or activation from the location server according to the fourth indication information, and perform PRS measurement in the target BWP.

The positioning measurement apparatus in this embodiment of this application may be an apparatus, and may also be a component in a terminal, an integrated circuit, or a chip. The apparatus may be a mobile terminal, or may be a non-mobile terminal. For example, the mobile terminal may include, but is not limited to, a type of the terminal 11 listed above, and a non-mobile terminal may be a server, a Network Attached Storage (NAS), a personal computer (PC), a television (TV), a cash machine, a self-service machine, or the like, which is not specifically limited in this embodiment of this application.

The positioning measurement apparatus in this embodiment of this application may be an apparatus having an operating system. The operating system may be an Android operating system, may be an ios operating system, and may further be another possible operating system, which is not specifically limited in this embodiment of this application.

The positioning measurement apparatus 50 provided in this embodiment of this application may implement various processes of the method embodiment in FIG. 2, and implement the same technical effect, which will not be described in detail herein again to avoid repetition.

Figure 6:
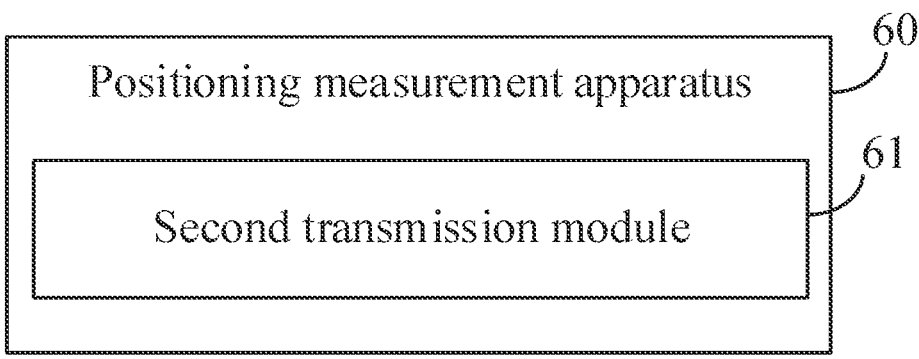
FIG. 6 is a schematic structural diagram of another positioning measurement apparatus according to an embodiment of this application.

FIG. 6 is a schematic structural diagram of a positioning measurement apparatus according to an embodiment of this application, which is applied to a serving base station. As shown in FIG. 6, the positioning measurement apparatus 60 includes:
- a second transmitting module 61, configured to transmit target signaling to a terminal, where the target signaling is used for indicating the terminal to switch to a target BWP and perform PRS measurement in the target BWP.

In some embodiments, before the transmitting target signaling to a terminal, the positioning measurement apparatus 60 further includes:
- a second receiving module, configured to receive partial or entire PRS configuration information transmitted by a location server; and
- the second transmitting module 61 is further configured to transmit the target signaling to the terminal according to the partial or entire PRS configuration information.

In some embodiments, the target signaling includes at least one of the following:
- switching signaling for switching a current active BWP to the target BWP;
- activation signaling for a target serving cell;
- addition signaling for a target serving cell; or
- activation signaling for the target BWP.

In some embodiments, the second receiving module is further configured to receive first request signaling transmitted by the terminal, where the first request signaling is used for indicating that the terminal is to perform PRS measurement in the target BWP.

In some embodiments, the second transmitting module 61 is further configured to transmit a rejection response to at least one of the terminal or a location server. For the content that is included in the rejection response, reference may be made to the description in the embodiment shown in FIG. 2, and details are not repeated herein.

In some embodiments, the second receiving module is further configured to receive second request signaling transmitted by the terminal, where the second request signaling is used for indicating that the terminal is to stop performing PRS measurement in the target BWP.

In some embodiments, the second request signaling is further used for requesting the serving base station to perform at least one of the following operations:
- switching the target BWP to a default or regular BWP;
- deactivating a target serving cell;
- deleting or releasing a target serving cell; or
- deactivating the target BWP.

In some embodiments, the second transmitting module 61 is further configured to transmit at least one of the following signaling to the terminal.
- deletion signaling or release signaling for a target serving cell;
- deactivation signaling for a target serving cell;
- switching signaling for switching the target BWP to a default or regular BWP; or
- deactivation signaling for the target BWP.

In some embodiments, the second receiving module is further configured to receive a positioning measurement result reported by the terminal, where the positioning measurement result is obtained by the terminal by performing PRS measurement in the target BWP.

In some embodiments, the second receiving module is further configured to receive a terminal capability reported by the terminal. For the content that is included in the terminal capability, reference may be made to the description in the embodiment shown in FIG. 2, and details are not repeated herein.

The positioning measurement apparatus 60 provided in this embodiment of this application may implement various processes of the method embodiment in FIG. 3, and implement the same technical effect, which will not be described in detail herein again to avoid repetition.

Figure 7A:
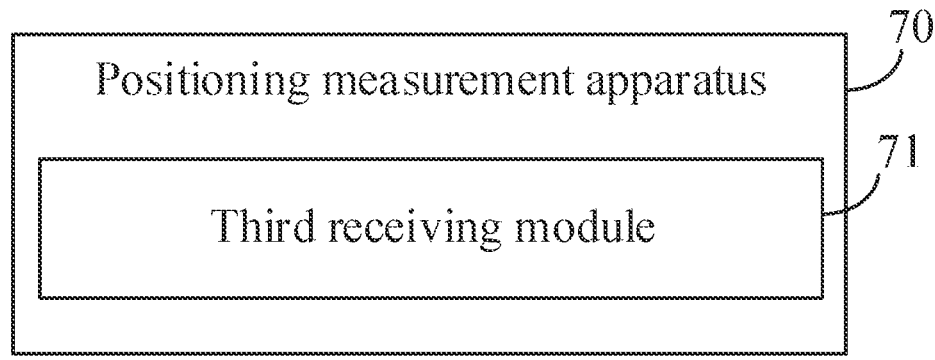
FIG. 7A is a schematic structural diagram of another positioning measurement apparatus according to an embodiment of this application.

FIG. 7A is a schematic structural diagram of a positioning measurement apparatus according to an embodiment of this application, which is applied to a location server. As shown in FIG. 7A, the positioning measurement apparatus 70 includes:
- a third receiving module 71, configured to receive a positioning measurement result transmitted by a terminal, where
- the positioning measurement result is obtained by the terminal by performing PRS measurement in a target BWP after switching to the target BWP.

In some embodiments, the positioning measurement apparatus 70 includes:
- a third transmitting module, configured to transmit partial or entire PRS configuration information to a serving base station. For the content that is included in the partial or entire PRS configuration information, reference may be made to the description in the embodiment shown in FIG. 2, and details are not repeated herein.

In some embodiments, the third receiving module 71 is further configured to receive feedback information transmitted by the terminal, where the feedback information includes: first indication information used for indicating whether the terminal has transmitted first request signaling to a serving base station; and the first request signaling is used for indicating that the terminal is to perform PRS measurement in the target BWP.

In some embodiments, the third receiving module 71 is further configured to receive a rejection response transmitted by at least one of the terminal or a serving base station, where the rejection response corresponds to first request signaling transmitted by the terminal to the serving base station, and the first request signaling is used for indicating that the terminal is to perform PRS measurement in the target BWP. For the content that is included in the first request signaling and the rejection response, reference may be made to the description in the embodiment shown in FIG. 2, and details are not repeated herein.

In some embodiments, the positioning measurement apparatus 70 further includes:

a second execution module, configured to, according to the rejection response, perform at least one of the following:

restoring PRS configuration information;

modifying PRS configuration information;

transmitting determined PRS configuration information through signaling to the terminal;

transmitting determined PRS configuration information through signaling to a plurality of base stations participating in PRS positioning;

adjusting an expected positioning requirement;

adjusting a performance indicator of the terminal;

reporting information about and a reason for a failure of meeting the positioning requirement to an upper-layer network node; or transmitting request information of a measurement gap to the serving base station.

In some embodiments, the third receiving module 71 is further configured to receive a terminal capability reported by the terminal. For the content that is included in the terminal capability, reference may be made to the description in the embodiment shown in FIG. 2, and details are not repeated herein.

The positioning measurement apparatus 70 provided in this embodiment of this application may implement various processes of the method embodiment in FIG. 4, and implement the same technical effect, which will not be described in detail herein again to avoid repetition.

Figure 7B:
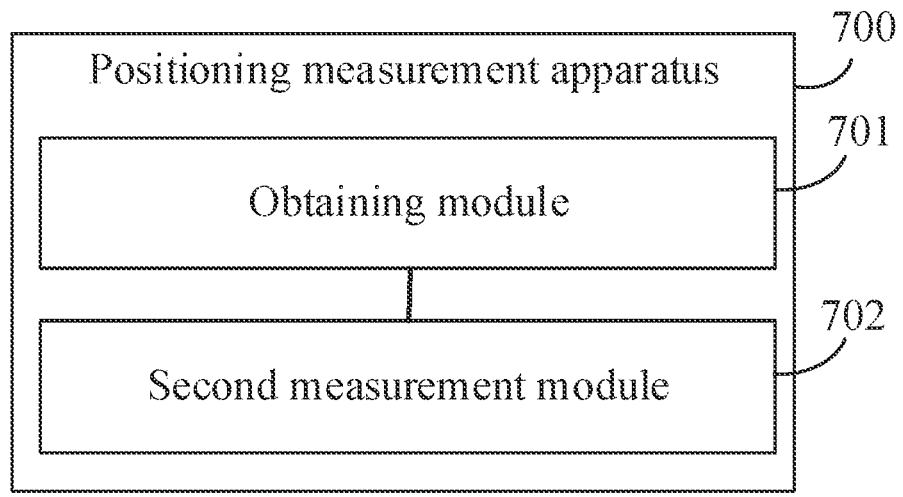
FIG. 7B is a schematic structural diagram of another positioning measurement apparatus according to an embodiment of this application.

FIG. 7B is a schematic structural diagram of a positioning measurement apparatus according to an embodiment of this application, which is applied to a terminal. As shown in FIG. 7B, the positioning measurement apparatus 700 includes:

an obtaining module 701, configured to obtain a measurement gap for positioning measurement; and a second measurement module 702, configured to perform PRS measurement on the measurement gap.

In some embodiments, the second measurement module 702 is further configured to perform PRS measurement in a measurement gap in a case that the measurement gap is configured for the terminal, and a serving cell is activated or deactivated in the measurement gap.

In some embodiments, the second measurement module 702 is further configured to perform PRS measurement in a configured measurement gap according to activation or deactivation signaling for a serving cell in a case that configuration of the measurement gap is carried in the activation or deactivation signaling for the serving cell.

In some embodiments, when requesting a measurement gap for the terminal is triggered by activation or deactivation of a serving cell, the obtaining module 701 is further configured to: obtain activation or deactivation signaling for a target serving cell; and the positioning measurement apparatus 700 further includes:

a request module, configured to request a measurement gap from a serving base station according to the activation or deactivation signaling for the serving cell.

The positioning measurement apparatus 700 provided in this embodiment of this application may implement various processes of the method embodiment in FIG. 5A, and implement the same technical effect, which will not be described in detail herein again to avoid repetition.

Figure 8:
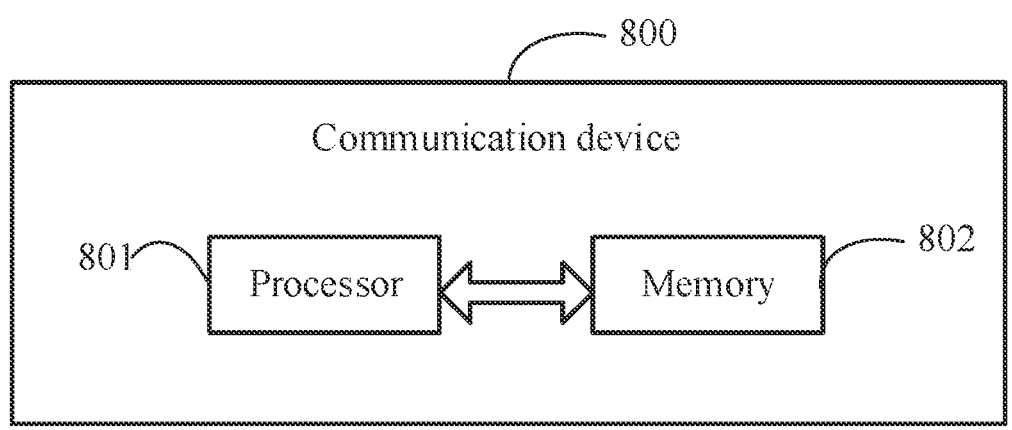
FIG. 8 is a schematic structural diagram of a communication device according to an embodiment of this application.

In some embodiments, as shown in FIG. 8, this embodiment of this application further provides a communication device 800, including a processor 801, a memory 802, and a program or instruction stored in the memory 802 and executable on the processor 801. For example, when the communication device 800 is a terminal, the program or instruction is executed by the processor 801 to implement the various processes of the method embodiments shown in FIG. 2 or FIG. 5A, and may implement the same technical effect. When the communication device 800 is a serving base station, the program or instruction is executed by the processor 801 to implement the various processes of the method embodiment shown in FIG. 3, and may implement the same technical effect. When the communication device 800 is a location server, the program or instruction is executed by the processor 801 to implement the various processes of the method embodiment shown in FIG. 4, and may implement the same technical effect, which will not be described in detail herein again to avoid repetition.

Figure 9:
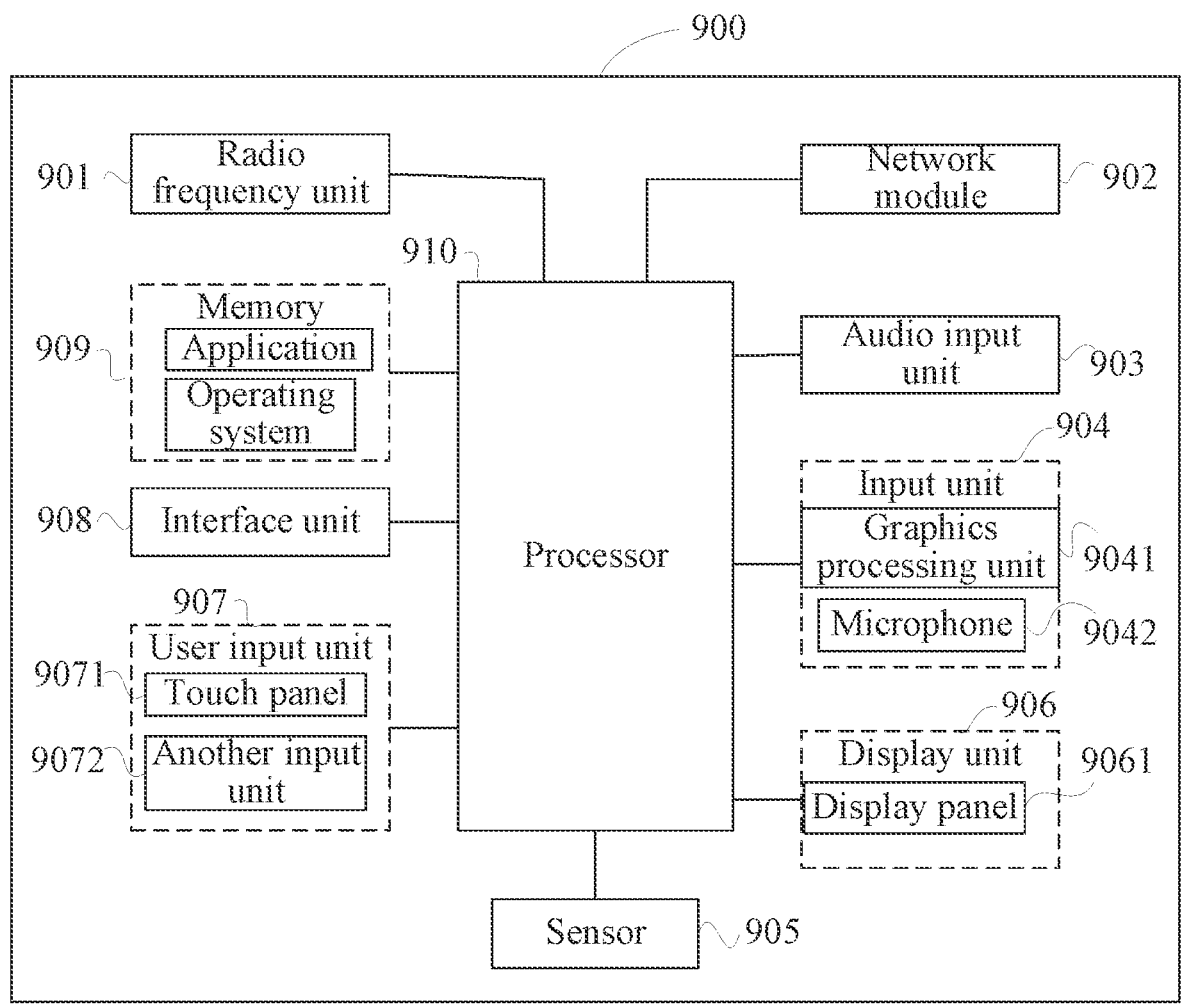
FIG. 9 is a schematic structural diagram of a terminal according to an embodiment of this application.

FIG. 9 is a schematic diagram of a hardware structure of a terminal according to an embodiment of this application.

The terminal 900 includes, but is not limited to, components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that the terminal 900 may further include the power supply (such as a battery) for supplying power to the components. The power supply may be logically connected to the processor 910 by a power management system, thereby implementing functions such as charging, discharging, and power consumption management by using the power management system. A terminal structure shown in FIG. 9 does not constitute a limitation to the terminal, and the terminal may include more or fewer components than those shown in the figure, or some components may be combined, or a different component deployment may be used, and details are not repeated herein.

It should be understood that, in this embodiment of this application, the input unit 904 may include a Graphics Processing Unit (GPU) 9041 and a microphone 9042. The graphics processing unit 9041 performs processing on image data of a static picture or a video that is obtained by an image acquisition apparatus (for example, a camera) in a video acquisition mode or an image acquisition mode. The display unit 906 may include a display panel 9061, and the display panel 9061 may be configured by using a liquid crystal display, an organic light-emitting diode, or the like. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include, but not limited to, a physical keyboard, a functional key (such as a volume control key or a switch key), a track ball, a mouse, and a joystick, which are not described herein in detail.

In this embodiment of this application, the radio frequency unit 901 receives downlink data from a network-side device and transmits the downlink data to the processor 910 for processing; and transmits uplink data to the network-side device. Generally, the radio frequency unit 901 includes, but is not limited to, an antenna, at least one amplifier, a transceiver, a coupler, a low noise amplifier, a duplexer, and the like.

The memory 909 may be configured to store a software program or an instruction and various data. The memory 909 may mainly include a program or instruction storage area and a data storage area. The program or instruction storage area may store an operating system, an application program or instruction required by at least one function (such as a sound playback function and an image display function), and the like. In addition, the memory 909 may include a high-speed random access memory, and may further include a non-volatile memory, where the non-volatile memory may be a Read-Only Memory (ROM), a Programmable ROM (PROM), an Erasable PROM (EPROM), an Electrically EPROM (EEPROM), or a flash memory. Such as at least one magnetic disk storage device, a flash memory device, or other non-volatile solid-state storage devices.

The processor 910 may include one or more processing units. In some embodiments, the processor 910 may integrate an application processor and a modem, where the application processor mainly processes an operating system, a user interface, and an application program or instruction, and the modem mainly processes wireless communication, such as a baseband processor. It may be understood that the foregoing modem may either not be integrated into the processor 910.

In some embodiments, the processor 910 is configured to switch to the target BWP and perform PRS measurement in the target BWP.

In some embodiments, the processor 910 is configured to obtain a measurement gap for positioning measurement, and perform PRS measurement in the measurement gap.

The terminal 900 provided in this embodiment of this application may implement various processes of the method embodiments shown in FIG. 2 or FIG. 5A, and implement the same technical effect, which will not be described in detail herein again to avoid repetition.

Figure 10:
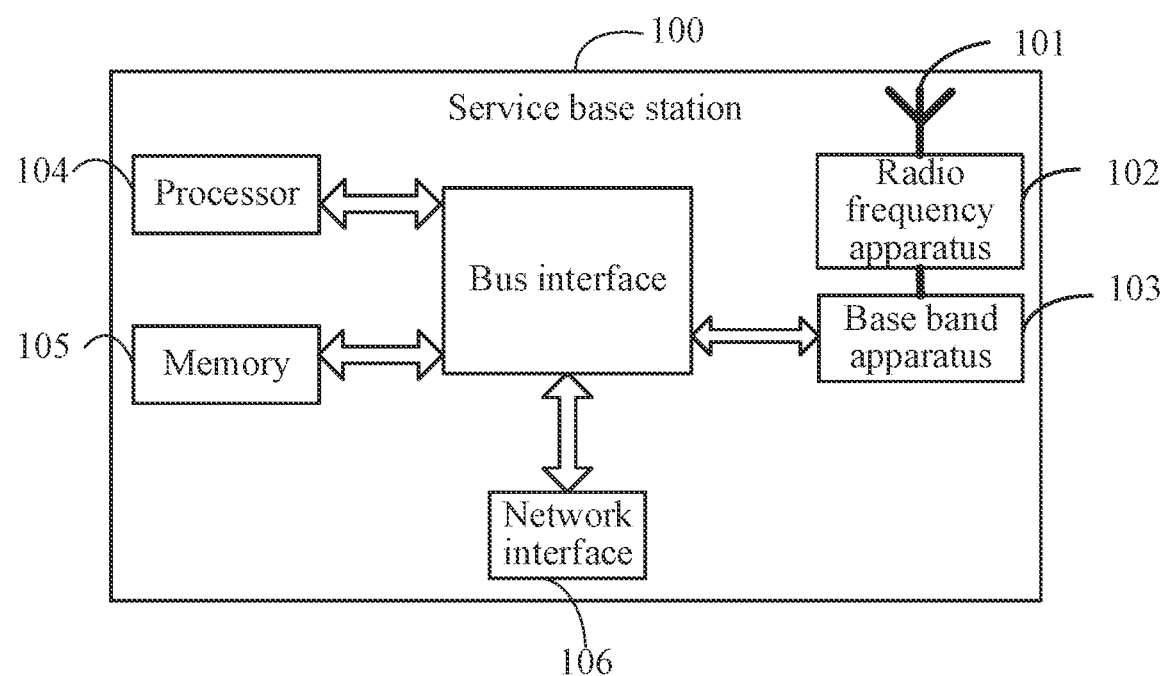
FIG. 10 is a schematic structural diagram of a serving base station according to an embodiment of this application.

Embodiments of this application further provides a serving base station. As shown in FIG. 10, the serving base station 100 includes: an antenna 101, a radio frequency apparatus 102, and a baseband apparatus 103. The antenna 101 is connected with the radio frequency apparatus 102. In an uplink direction, the radio frequency apparatus 102 receives information through the antenna 101, and transmits the received information to the baseband apparatus 103 for processing. In a downlink direction, the baseband apparatus 103 performs processing on the to-be-transmitted information, and transmits the to-be-transmitted information to the radio frequency apparatus 102. After performing processing on the received information, the radio frequency apparatus 102 transmits the received information out through the antenna 101.

The frequency band processing apparatus may be located in the baseband apparatus 103, and the method performed by the serving base station in the foregoing embodiments may be implemented in the baseband apparatus 103. The baseband apparatus 103 includes a processor 104 and a memory 105.

The baseband apparatus 103 may include, for example, at least one baseband board, and a plurality of chips are arranged on the baseband board. As shown in FIG. 10, for example, one of the chips is a processor 104, and is connected with the memory 105, to invoke the program in the memory 105, and to perform the network device operation shown in the foregoing method embodiments.

The baseband apparatus 103 may further include a network interface 106 used for exchanging information with the radio frequency apparatus 102. For example, the interface is a common public radio interface (CPRI).

In some embodiments, the serving base station of this embodiment of this application further includes: an instruction or program stored in the memory 105 and executable on the processor 104. The processor 104 invokes the instruction or program in the memory 105 to perform the method performed by each module shown in FIG. 6, and implements the same technical effect, which will not be described in detail herein again to avoid repetition.

This embodiment of this application further provides a readable storage medium, storing a program or instruction, where the program or instruction, when executed by a processor, implements the various processes of the embodiment shown in FIG. 2, or implements the various processes of the embodiment shown in FIG. 3, or implements the various processes of the embodiment shown in FIG. 4, or implements the various processes of the embodiment shown in FIG. 5A, and the same technical effects may be achieved. To avoid repetition, details are not described herein again.

The processor is a processor in the terminal described in the foregoing embodiment. The readable storage medium includes a computer-readable storage medium, for example, a Read-Only Memory (ROM), a Random Access Memory (RAM), a magnetic disk, an optical disc or the like.

This embodiment of this application further provides a chip. The chip includes a processor and a communication interface. The communication interface is coupled to the processor. The processor is configured to run a program or instruction to implement the various processes of the embodiment shown in FIG. 2, or implement the various processes of the embodiment shown in FIG. 3, or implement the various processes of the embodiment shown in FIG. 4, or implement the various processes of the embodiment shown in FIG. 5A, and the same technical effects may be achieved, which will not be described in detail herein again to avoid repetition.

It should be understood that, the chip mentioned in this embodiment of this application may also be referred to as a system-level chip, a system chip, a chip system, a system on chip, or the like.

It is to be noted that the terms "include", "comprise" and any other variants mean to cover the non-exclusive inclusion, so that the process, method, object, or apparatus which include a series of elements not only include those elements, but also include other elements which are not clearly listed, or include inherent elements of the process, method, object, or apparatus. Without more limitations, elements defined by the sentence "including one" does not exclude that there are still other same elements in the processes, methods, objects, or apparatuses. In addition, it should be noted that the scope of the methods and apparatuses in the implementations of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. The embodiment methods may also be implemented by using hardware, but the former is a better implementation in many cases. Based on such an understanding, the technical solutions of this application essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of this application.

It is to be noted that, a division of each module of the device is only a division of logical functions, and may be fully or partially integrated into a physical entity in actual implementation, and may also be physically separated. The modules may all be implemented in the form of software invoked by a processing element, or implemented in the form of hardware, and some modules may further be implemented in the form of software invoked by a processing element, and some modules may be implemented in the form of hardware. For example, the switching module may be an independently disposed processing element, or may be integrated in a chip of the foregoing apparatus. In addition, the processing module may be stored in a memory of the foregoing apparatus in the form of program code, and a processing element of the foregoing apparatus invokes and executes a function of the switching module. The implementation of other modules is similar. In addition, all or some of the modules may be integrated together, or may be implemented independently. The processing element may be an integrated circuit and has a signal processing capability. In an implementation process, steps in the foregoing methods or the foregoing modules can be implemented by using a hardware integrated logical circuit in a processor element, or by using instructions in a form of software.

For example, each module, unit, subunit, or submodule may be one or more integrated circuits configured to implement the foregoing methods, for example, one or more Application Specific Integrated Circuit (ASIC), or one or more digital signal processors (DSP), or one or more field programmable gate arrays (FPGA). In another example, when a module described above is implemented in a form of a processing element scheduling program code, the processing element may be a general-purpose processor, for example, a Central Processing Unit (CPU) or another processor that can invoke program code. In another example, such modules may be integrated together and implemented in a form of a system-on-a-chip (SOC).

Although the embodiments of this application have been described above with reference to the accompanying drawings, this application is not limited to the specific implementations described above, and the specific embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A method for positioning measurement, performed by a terminal, comprising:
   switching to a target bandwidth part (BWP);
   performing positioning reference signal (PRS) measurement in the target BWP; and
   performing, when the terminal receives deactivation signaling for a target serving cell, and the deactivation signaling for the target serving cell comprises an indication for configuration of a measurement gap, PRS measurement in the configured measurement gap according to the deactivation signaling for the target serving cell.

2. The method according to claim 1, wherein a target serving cell in which the target BWP is located is any one of the following:
an activated serving cell, a serving cell that is configured but is not activated, or an unconfigured serving cell.

3. The method according to claim 1, wherein before performing the PRS measurement, further comprising:
   receiving target signaling transmitted by a serving base station,
   wherein the target signaling comprises at least one of the following:
      switching signaling for switching a current active BWP to the target BWP;
      activation signaling for the target serving cell;
      addition signaling for the target serving cell; or
      activation signaling for the target BWP.

4. The method according to claim 1, further comprising:
   transmitting first request signaling to a serving base station,
   wherein the first request signaling is used for indicating that the terminal is to perform PRS measurement in the target BWP.

5. The method according to claim 4, wherein the first request signaling is further used for requesting the serving base station to perform at least one of the following:
   switching the target BWP;
   activating the target BWP;
   activating the target serving cell; or
   adding the target serving cell,
   wherein the first request signaling comprises at least one of the following:
      switching request signaling for the target BWP;
      activation request signaling for the target serving cell;
      addition request signaling for the target serving cell;
      activation request signaling for the target BWP;
      a target BWP identifier;
      a serving cell identifier of the target serving cell;
      an identifier of a current active BWP that is switched;
      a serving cell identifier of a cell in which a current active BWP that is switched is located;
      target BWP configuration information expected by the terminal;
      target serving cell configuration information expected by the terminal;
      partial or entire PRS configuration information;
      frequency domain location information on which the terminal expects to perform measurement;
      time domain location information on which the terminal expects to perform measurement;
      an effective time or duration of positioning measurement;
      an effective time or duration of positioning reporting;
      an effective time of the target BWP;
      an effective time of the target serving cell;
      a priority of a current location service or positioning measurement;
      importance of a current location service or positioning measurement;
      a reason for not requesting the measurement gap; or
      a request identifier of the measurement gap.

6. The method according to claim 3, wherein the target BWP is a first active BWP in an activated target serving cell; or
   the target BWP is a first active BWP in an added target serving cell.

7. The method according to claim 1, further comprising:
   transmitting second request signaling to a serving base station, wherein the second request signaling is used for indicating that the terminal is to stop performing PRS measurement in the target BWP.

8. The method according to claim 1, wherein after performing the PRS measurement, further comprising:
receiving at least one of the following signaling transmitted by a serving base station:
deletion signaling or release signaling for the target serving cell;
switching signaling for switching the target BWP to a default or regular BWP; or
deactivation signaling for the target BWP.

9. The method according to claim 1, wherein after performing the PRS measurement, further comprising:
reporting a positioning measurement result to at least one of a location server or a serving base station.

10. The method according to claim 1, wherein before performing the PRS measurement, further comprising:
reporting a terminal capability to at least one of a location server or a serving base station,
wherein the terminal capability comprises at least one of the following:
whether to support performing PRS measurement in a manner of BWP switching;
whether to support performing PRS measurement in the measurement gap;
whether to support a positioning-specific BWP;
whether to support a positioning-specific serving cell;
whether to support simultaneously measuring PRSs of a plurality of positioning frequency layers;
whether to support simultaneously measuring PRSs of a plurality of serving cells or PRSs of a plurality of BWPs;
whether to support simultaneously requesting a plurality of target BWPs;
whether to support simultaneously switching a plurality of BWPs;
whether to support simultaneously activating a plurality of BWPs;
a PRS measuring capability of the terminal when the BWP is configured to perform PRS measurement;
whether to support requesting the target BWP for PRS measurement;
whether to support requesting the measurement gap for PRS measurement;
whether to support simultaneously configuring the measurement gap and performing target BWP switching for PRS measurement; or
whether to support simultaneously configuring the measurement gap and performing target BWP activation for PRS measurement.

11. The method according to claim 1, further comprising:
performing PRS measurement in the measurement gap when the measurement gap is configured for the terminal, and the target serving cell is activated or deactivated in the measurement gap.

12. The method according to claim 1, further comprising:
requesting the measurement gap from a serving base station according to the deactivation signaling for the target serving cell, wherein the measurement gap is used for performing PRS measurement.

13. The method according to claim 1, wherein before performing the PRS measurement, further comprising:
receiving third indication information from at least one of a location server or a serving base station,
wherein the third indication information is used for indicating whether the terminal is allowed to request BWP switching for PRS measurement.

14. The method according to claim 1, wherein when the terminal supports requesting the measurement gap and supports requesting target BWP switching or activation, the method further comprises:
receiving fourth indication information from at least one of a location server or a serving base station, wherein the fourth indication information is used for indicating a priority of the measurement gap and BWP switching; and
requesting the measurement gap from the location server according to the fourth indication information, and performing PRS measurement in the measurement gap; or
requesting the target BWP switching or activation from the location server according to the fourth indication information, and performing PRS measurement in the target BWP.

15. A method for positioning measurement, performed by a serving base station, comprising:
transmitting target signaling to a terminal, wherein the target signaling is used for indicating the terminal to switch to a target bandwidth part (BWP) and perform positioning reference signal (PRS) measurement in the target BWP; and
transmitting deactivation signaling for a target serving cell to the terminal, wherein:
the deactivation signaling for the target serving cell comprises an indication for configuration of a measurement gap; and
the deactivation signaling for the target serving cell is used for indicating the terminal to perform PRS measurement in the configured measurement gap according to the deactivation signaling for the target serving cell.

16. The method according to claim 15, wherein before transmitting the target signaling to the terminal, further comprising:
receiving partial or entire PRS configuration information transmitted by a location server; and
the transmitting target signaling to a terminal comprises:
transmitting the target signaling to the terminal according to the partial or entire PRS configuration information.

17. The method according to claim 15, wherein the target signaling comprises at least one of the following:
switching signaling for switching a current active BWP to the target BWP;
activation signaling for the target serving cell;
addition signaling for the target serving cell; or
activation signaling for the target BWP.

18. The method according to claim 15, wherein before transmitting the target signaling to the terminal, further comprising:
receiving first request signaling transmitted by the terminal, wherein the first request signaling is used for indicating that the terminal is to perform PRS measurement in the target BWP.

19. A terminal device, comprising:
a memory storing a computer program; and
a processor coupled to the memory and configured to execute the computer program to perform operations comprising:
switching the terminal device to a target bandwidth part (BWP);

performing positioning reference signal (PRS) measurement in the target BWP; and performing, when the terminal receives deactivation signaling for a target serving cell; and the deactivation signaling for the target serving cell comprises an indication for configuration of a measurement gap, PRS measurement in the configured measurement gap according to the deactivation signaling for the target serving cell.

* * * * *